(12) United States Patent
Li et al.

(10) Patent No.: US 12,228,700 B2
(45) Date of Patent: Feb. 18, 2025

(54) OPTICAL IMAGING LENS GROUP INCLUDING SEVEN LENSES +-+--+-, +----+-, +-++-+-, +-+-++- or +++-++- REFRACTIVE POWERS

(71) Applicant: ZHEJIANG SUNNY OPTICS CO., LTD., Zhejiang (CN)

(72) Inventors: Yanping Li, Zhejiang (CN); Lingbo He, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 748 days.

(21) Appl. No.: 17/368,867

(22) Filed: Jul. 7, 2021

(65) Prior Publication Data

US 2022/0113516 A1    Apr. 14, 2022

(30) Foreign Application Priority Data

Oct. 13, 2020    (CN) .......................... 202011092763.5

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

| | | | |
|---|---|---|---|
| 2019/0121089 A1* | 4/2019 | Fang | G02B 9/64 |
| 2020/0409088 A1* | 12/2020 | Chen | G02B 9/64 |
| 2022/0011549 A1* | 1/2022 | Peng | G02B 13/06 |

FOREIGN PATENT DOCUMENTS

| | | |
|---|---|---|
| CN | 107664817 A | 2/2018 |
| CN | 107664824 A | 2/2018 |
| CN | 109828350 A | 5/2019 |

(Continued)

OTHER PUBLICATIONS

The search report of family CN application No. 2021107300967 issue on Feb. 25, 2022.

*Primary Examiner* — Wen Huang
(74) *Attorney, Agent, or Firm* — Samson G. Yu

(57) ABSTRACT

The disclosure provides an optical imaging lens group. The optical imaging lens group sequentially includes from an object side to an image side along an optical axis of the optical imaging lens group: a first lens with a positive refractive power; a second lens with a refractive power, an image-side surface of the second lens is a concave surface; a third lens with a refractive power; a fourth lens with a refractive power, an image-side surface of the fourth lens is a concave surface; a fifth lens with a refractive power; a sixth lens with a refractive power, an image-side surface of the sixth lens is a concave surface; and a seventh lens with a negative refractive power. A maximum field of view FOV of the optical imaging lens group and an effective focal length f of the optical imaging lens group satisfy tan(FOV/2)*f>5 mm.

13 Claims, 12 Drawing Sheets

(56) References Cited

FOREIGN PATENT DOCUMENTS

| CN | 110361837 A | 10/2019 |
|----|-------------|---------|
| CN | 211043777 U | 7/2020  |
| CN | 211086744 U | 7/2020  |

\* cited by examiner longitudinal aberration curve longitudinal aberration curve longitudinal aberration curve

OPTICAL IMAGING LENS GROUP INCLUDING SEVEN LENSES +−+−−+−, +−−−−+−, +−++−+−, +−+−++− or +++−++− REFRACTIVE POWERS

CROSS-REFERENCE TO RELATED PRESENT INVENTION(S)

The disclosure claims priority to and the benefit of Chinese Patent Present invention No. 202011092763.5, filed in the China National Intellectual Property Administration (CNIPA) on 13 Oct. 2020, which is incorporated herein by reference in its entirety.

TECHNICAL FIELD

The disclosure relates to the technical field of optical imaging devices, and particularly to an optical imaging lens group.

BACKGROUND

Cameras of mobile phones have been rapidly developed with the development of smart phones, from 8 mega-pixels in 2010 to 100 mega-pixels in 2020 and from single-lens cameras a few years ago to present combined multi-lens cameras. As one of key members of combined multi-lens camera, main camera lens with a high pixel and a good overall shooting effect gradually becomes an important object that each major mobile phone company keeps researching and improving.

With the constant development of portable electronic products such as smart phones, requirements of users on the performance of camera lens groups of mobile phones have also increased. A multi-lens camera lens group that provides a higher degree of design freedom makes it more possible to improve the performance of a mobile phone. For conditions of poor light (for example, in rainy days and at dusk), shaking, etc., F-numbers above 2.0 cannot satisfy higher-order imaging requirements. In recent years, main camera lens has gradually played a role in macro shooting, and each major mobile terminal has made increasing requirements on macro functions of lenses.

That is, a camera lens in the related art has the problem of low imaging quality.

SUMMARY

A main purpose of the disclosure is to provide an optical imaging lens group, to solve the problem of low imaging quality of a camera lens in the related art.

In order to achieve the purpose, some embodiments of the disclosure provide an optical imaging lens group, which sequentially includes from an object side to an image side along an optical axis of the optical imaging lens group: a first lens with a positive refractive power; a second lens with a refractive power, an image-side surface of the second lens thereof is a concave surface; a third lens with a refractive power; a fourth lens with a refractive power, an image-side surface of the fourth lens thereof is a concave surface; a fifth lens with a refractive power; a sixth lens with a refractive power, an image-side surface of the sixth lens thereof is a concave surface; and a seventh lens with a negative refractive power; wherein a maximum field of view FOV of the optical imaging lens group and an effective focal length f of the optical imaging lens group satisfy $\tan(FOV/2)*f>5$ mm; and a curvature radius R12 of the image-side surface of the sixth lens and a curvature radius R14 of an image-side surface of the seventh lens satisfy $1<R12/R14<2$.

In an implementation mode, the optical imaging lens group is arranged on an electronic photosensitive element, and ImgH is a half of a diagonal length of an effective pixel region of the electronic photosensitive element, and a spacing distance TTL from an object-side surface of the first lens to an imaging surface of the electronic photosensitive element on the optical axis and ImgH satisfy $TTL/ImgH<1.5$.

In an implementation mode, an effective focal length f6 of the sixth lens and an effective focal length f7 of the seventh lens satisfy $-2<f6/f7<-1$.

In an implementation mode, a curvature radius R2 of an image-side surface of the first lens, a curvature radius R3 of an object-side surface of the second lens, and a spacing distance T12 between the first lens and the second lens on the optical axis satisfy $|R2-R3|/T12<12$.

In an implementation mode, a curvature radius R11 of an object-side surface of the sixth lens and the effective focal length f of the optical imaging lens group satisfy $R11/f<0.5$.

In an implementation mode, a center thickness CT3 of the third lens on the optical axis and a center thickness CT4 of the fourth lens on the optical axis satisfy $100*|CT3-CT4|<10$.

In an implementation mode, a spacing distance T45 between the fourth lens and the fifth lens on the optical axis and a spacing distance T56 between the fifth lens and the sixth lens on the optical axis satisfy $T45/T56<1.5$.

In an implementation mode, an on-axis spacing distance SAG62 from an intersection point of the image-side surface of the sixth lens and the optical axis to an effective radius vertex of the image-side surface of the sixth lens and a center thickness CT6 of the sixth lens on the optical axis satisfy $-1.5<SAG62/CT6<-0.9$.

In an implementation mode, ImgH is a half of the diagonal length of the effective pixel region of the electronic photosensitive element, and an effective semi-diameter DT11 of the object-side surface of the first lens and ImgH satisfy $DT11/ImgH<0.4$.

In an implementation mode, an effective radius DT61 of the object-side surface of the sixth lens, an effective radius DT52 of an image-side surface of the fifth lens, an effective radius DT51 of an object-side surface of the fifth lens and an effective radius DT42 of the image-side surface of the fourth lens satisfy $2<(DT61-DT52)/(DT51-DT42)<20$.

In an implementation mode, an edge thickness ET5 of the fifth lens and a center thickness CT5 of the fifth lens on the optical axis satisfy $0.8<ET5/CT5<1.2$.

In an implementation mode, each of the object-side surface of the sixth lens and the image-side surface of the sixth lens has at least one critical point, and a vector height YT61 along the optical axis from the center of the object-side surface of the sixth lens to the critical point of the object-side surface of the sixth lens closest to the optical axis and a vector height YT62 along the optical axis from the center of the image-side surface of the sixth lens to the critical point of the image-side surface of the sixth lens closest to the optical axis satisfy $0.8<YT61/YT62<1.3$.

In an implementation mode, a distance OT from a shot object to the object-side surface of the first lens on the optical axis and the spacing distance TTL from the object-side surface of the first lens to the imaging surface of the electronic photosensitive element on the optical axis satisfy $OT/TTL<30$.

In an implementation mode, an abbe number V3 of the third lens and an abbe number V4 of the fourth lens satisfy $V3>V4$.

In an implementation mode, a maximum distortion DISTmax of the optical imaging lens group satisfies 5%<|DISTmax|<50%.

Some other embodiments of the disclosure also provide an optical imaging lens group, which sequentially includes from an object side to an image side along an optical axis of the optical imaging lens group: a first lens with a positive refractive power; a second lens with a refractive power, an image-side surface of the second lens thereof is a concave surface; a third lens with a refractive power; a fourth lens with a refractive power, an image-side surface of the fourth lens thereof is a concave surface; a fifth lens with a refractive power; a sixth lens with a refractive power, an image-side surface of the sixth lens thereof is a concave surface; and a seventh lens with a negative refractive power; wherein a maximum field of view FOV of the optical imaging lens group and an effective focal length f of the optical imaging lens group satisfy tan(FOV/2)*f>5 mm; and a spacing distance T67 between the sixth lens and the seventh lens on the optical axis and a spacing distance TD between an object-side surface of the first lens and an image-side surface of the seventh lens on the optical axis satisfy 1<T67/TD<2.

In an implementation mode, a curvature radius R12 of an image-side surface of the sixth lens and a curvature radius R14 of the image-side surface of the seventh lens satisfy 1<R12/R14<2.

In an implementation mode, the optical imaging lens group is arranged on an electronic photosensitive element, and ImgH is a half of a diagonal length of an effective pixel region of the electronic photosensitive element, and a spacing distance TTL from the object-side surface of the first lens to an imaging surface of the electronic photosensitive element on the optical axis and ImgH satisfy TTL/ImgH<1.5.

In an implementation mode, an effective focal length f6 of the sixth lens and an effective focal length f7 of the seventh lens satisfy −2<f6/f7<−1.

In an implementation mode, a curvature radius R2 of an image-side surface of the first lens, a curvature radius R3 of an object-side surface of the second lens and a spacing distance T12 between the first lens and the second lens on the optical axis satisfy |R2−R3|/T12<12.

In an implementation mode, a curvature radius R11 of an object-side surface of the sixth lens and the effective focal length f of the optical imaging lens group satisfy R11/f<0.5.

In an implementation mode, a center thickness CT3 of the third lens on the optical axis and a center thickness CT4 of the fourth lens on the optical axis satisfy 100*|CT3−CT4|<10.

In an implementation mode, a spacing distance T45 between the fourth lens and the fifth lens on the optical axis and a spacing distance T56 between the fifth lens and the sixth lens on the optical axis satisfy T45/T56<1.5.

In an implementation mode, an on-axis spacing distance SAG62 from an intersection point of the image-side surface of the sixth lens and the optical axis to an effective radius vertex of the image-side surface of the sixth lens and a center thickness CT6 of the sixth lens on the optical axis satisfy −1.5<SAG62/CT6<−0.9.

In an implementation mode, ImgH is a half of the diagonal length of the effective pixel region of the electronic photosensitive element, and an effective semi-diameter DT11 of the object-side surface of the first lens and ImgH satisfy DT11/ImgH<0.4.

In an implementation mode, an effective radius DT61 of the object-side surface of the sixth lens, an effective radius DT52 of an image-side surface of the fifth lens, an effective radius DT51 of an object-side surface of the fifth lens and an effective radius DT42 of the image-side surface of the fourth lens satisfy 2<(DT61−DT52)/(DT51−DT42)<20.

In an implementation mode, an edge thickness ET5 of the fifth lens and a center thickness CT5 of the fifth lens on the optical axis satisfy 0.8<ET5/CT5<1.2.

In an implementation mode, each of the object-side surface of the sixth lens and the image-side surface of the sixth lens has at least one critical point, and a vector height YT61 along the optical axis from the center of the object-side surface of the sixth lens to the critical point of the object-side surface of the sixth lens closest to the optical axis and a vector height YT62 along the optical axis from the center of the image-side surface of the sixth lens to the critical point of the image-side surface of the sixth lens closest to the optical axis satisfy 0.8<YT61/YT62<1.3.

In an implementation mode, a distance OT from a shot object to the object-side surface of the first lens on the optical axis and the spacing distance TTL from the object-side surface of the first lens to the imaging surface of the electronic photosensitive element on the optical axis satisfy OT/TTL<30.

In an implementation mode, an abbe number V3 of the third lens and an abbe number V4 of the fourth lens satisfy V3>V4.

In an implementation mode, a maximum distortion DISTmax of the optical imaging lens group satisfies 5%<|DISTmax|<50%.

With adoption of the technical solutions of the disclosure, the optical imaging lens group sequentially includes from the object side to the image side along the optical axis of the optical imaging lens group, the first lens with the positive refractive power, the second lens with the refractive power, the third lens with the refractive power, the fourth lens with the refractive power, the fifth lens with the refractive power, the sixth lens with the refractive power, and the seventh lens with the negative refractive power; wherein the image-side surface of the second lens is the concave surface, the image-side surface of the fourth lens is the concave surface, and the image-side surface of the sixth lens is the concave surface. The maximum field of view FOV of the optical imaging lens group and the effective focal length f of the optical imaging lens group satisfy tan(FOV/2)*f>5 mm. The curvature radius R12 of the image-side surface of the sixth lens and the curvature radius R14 of the image-side surface of the seventh lens satisfy 1<R12/R14<2.

The refractive power is configured reasonably, so that an astigmatism and a distortion may be reduced effectively, and the imaging quality of the optical imaging lens group may be improved greatly. The first lens has the positive refractive power, the second lens has the refractive power, and the image-side surface of the second lens is the concave surface, so that enlargement of an field of view is facilitated, and meanwhile, compression of an incident angle of a ray at a diaphragm STO, reduction of a pupil aberration, and improvement of the imaging quality are facilitated. The third lens has the refractive power, the fourth lens has the refractive power, and the image-side surface of the fourth lens is the concave surface, so that reduction of a spherical aberration and astigmatism of the optical imaging lens group is facilitated. The fifth lens has the refractive power, the sixth lens has the refractive power, and the image-side surface of the sixth lens is the concave surface, so that the characteristics of compact structure, large aperture, and high imaging quality of the optical imaging lens group are ensured favorably, and meanwhile, the optical imaging lens group is easy to machine. The seventh lens has negative refractive power, so that a spherical aberration contribution may be controlled reasonably in a reasonable range to achieve high imaging quality in an on-axis field of view, and meanwhile, the characteristic of large image surface may be achieved to achieve a relatively high luminous flux in an off-axis field of view. The maximum field of view FOV of the optical imaging lens group and the effective focal length f of the optical imaging lens group satisfy tan(FOV/2)*f>5 mm, so that the characteristic of large image surface of the optical imaging lens group is ensured. A ratio of the curvature radius R12 of the image-side surface of the sixth lens to the curvature radius R14 of the image-side surface of the seventh lens is controlled reasonably, so that an assembling segment gap of the sixth lens and the seventh lens may be controlled reasonably in a reasonable range for convenient machining and assembling.

BRIEF DESCRIPTION OF THE DRAWINGS

The drawings forming a part of the disclosure in the specification are adopted to provide a further understanding to the disclosure. Schematic embodiments of the disclosure and descriptions thereof are adopted to explain the disclosure and not intended to form improper limits to the disclosure. In the drawings.

Figure 1:
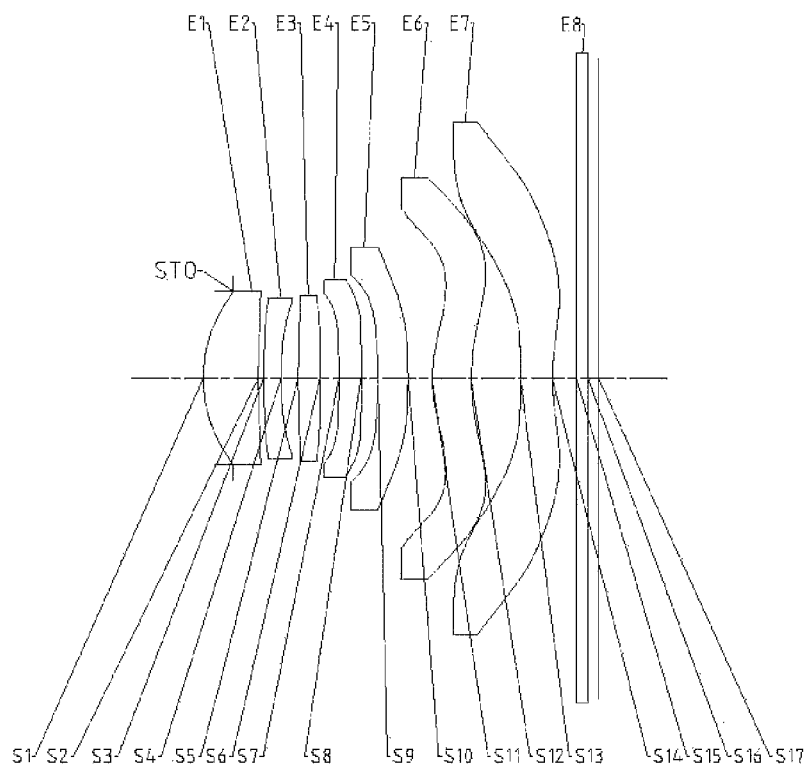
FIG. 1 shows a structural schematic diagram of an optical imaging lens group according to Example 1 of the disclosure.

Wherein, the drawings above include the following drawing reference signs:

STO: a diaphragm; E1: the first lens; S1: the object-side surface of the first lens; S2: the image-side surface of the first lens; E2: the second lens; S3: the object-side surface of the second lens; S4: the image-side surface of the second lens; E3: the third lens; S5: object-side surface of the third lens; S6: an image-side surface of the third lens; E4: the fourth lens; S7: an object-side surface of the fourth lens; S8: the image-side surface of the fourth lens; E5: the fifth lens; S9: the object-side surface of the fifth lens; S10: the image-side surface of the fifth lens; E6: the sixth lens; S11: the object-side surface of the sixth lens; S12: the image-side surface of the sixth lens; E7: the seventh lens; S13: an object-side surface of the seventh lens; S14: the image-side surface of the seventh lens; E8: an optical filter; S15: an object-side surface of the optical filter; S16: an image-side surface of the optical filter; and S17: the imaging surface.

DETAILED DESCRIPTION OF THE EMBODIMENTS

It is to be noted that the embodiments in the disclosure and characteristics in the embodiments may be combined without conflicts. The disclosure will be described below with reference to the drawings and in combination with the embodiments in detail.

It is to be pointed out that, unless otherwise specified, all technical and scientific terms used in the disclosure have the same meanings as commonly understood by those of ordinary skill in the art of the disclosure.

In the disclosure, unless conversely specified, the used orientation terms "upper, lower, top, and bottom" are usually for the directions shown in the drawings, or for a component in a vertical, perpendicular, or gravity direction. Similarly, for convenient understanding and description, "inner and outer" refer to inner and outer relative to a contour of each component. However, these orientation terms are not intended to limit the disclosure.

It should be noted that, in this description, the expressions of first, second, third, etc., are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, close to an object side, of each lens is called an object-side surface of the lens, and a surface, close to an image side, of each lens is called an image-side surface of the lens. A surface type of the paraxial region may be judged according to a judgment manner known to those of ordinary skill in the art, and whether a surface is concave or convex is judged according to whether an R value is positive or negative (R refers to a curvature radius of the paraxial region, usually refers to an R value on lens data in optical software). For example, an object-side surface is determined as a convex surface if the R value is positive, and is determined as a concave surface if the R value is negative. An image-side surface is determined as a concave surface if the R value is positive, and is determined as a convex surface is the R value is negative.

For solving the problem of low imaging quality of a camera lens in the related art, the disclosure provides an optical imaging lens group.

Embodiment 1

As shown in FIGS. 1-24, an optical imaging lens group sequentially includes from an object side to an image side along an optical axis of the optical imaging lens group, a first lens E1 with a positive refractive power, a second lens E2 with a refractive power, a third lens E3 with a refractive power, a fourth lens E4 with a refractive power, a fifth lens E5 with a refractive power, a sixth lens E6 with a refractive power, and a seventh lens E7 with a negative refractive power; wherein an image-side surface S4 of the second lens is a concave surface, an image-side surface S8 of the fourth lens is a concave surface, and an image-side surface S12 of the sixth lens is a concave surface. A maximum field of view of the optical imaging lens group and an effective focal length f of the optical imaging lens group satisfy tan(FOV/2)*f>5 mm; a curvature radius R12 of the image-side surface of the sixth lens and a curvature radius R14 of an image-side surface of the seventh lens satisfy 1<R12/R14<2.

The refractive power is configured reasonably, so that an astigmatism and a distortion may be reduced effectively, and the imaging quality of the optical imaging lens group may be improved greatly. The first lens E1 has the positive refractive power, the second lens E2 has the refractive power, and the image-side surface S4 of the second lens is the concave surface, so that enlargement of a field of view is facilitated, and meanwhile, compression of an incident angle of a ray at a diaphragm STO, reduction of a pupil aberration, and improvement of the imaging quality are facilitated. The third lens E3 has the refractive power, the fourth lens E4 has the refractive power, and the image-side surface S8 of the fourth lens is the concave surface, so that reduction of a spherical aberration and an astigmatism of the optical imaging lens group is facilitated. The fifth lens E5 has the refractive power, the sixth lens E6 has the refractive power, and the image-side surface S12 of the sixth lens is the concave surface, so that the characteristics of compact structure, large aperture and high imaging quality of the optical imaging lens group are ensured favorably, and meanwhile, the optical imaging lens group is easy to machine. The seventh lens E7 has the negative refractive power, so that a spherical aberration contribution may be controlled reasonably in a reasonable range to achieve high imaging quality in an on-axis field of view, and meanwhile, the characteristic of large image surface may be achieved to achieve a relatively high luminous flux in an off-axis field of view. The maximum field of view FOV of the optical imaging lens group and the effective focal length f of the optical imaging lens group satisfy tan(FOV/2)*f>5 mm, so that the characteristic of large image surface of the optical imaging lens group is ensured. A ratio of the curvature radius R12 of the image-side surface of the sixth lens to the curvature radius R14 of the image-side surface of the seventh lens is controlled reasonably, so that an assembling segment gap of the sixth lens E6 and the seventh lens E7 may be controlled effectively in a reasonable range for convenient machining and assembling.

More specifically, the maximum field of view of the optical imaging lens group and the effective focal length f of the optical imaging lens group may satisfy 5.3 mm<tan(FOV/2)*f<5.4 mm.

More specifically, the curvature radius R12 of the image-side surface of the sixth lens and the curvature radius R14 of the image-side surface of the seventh lens satisfy 1.1<R12/R14<1.5.

In the embodiment, the optical imaging lens group is arranged on an electronic photosensitive element, and ImgH is a half of a diagonal length of an effective pixel region of the electronic photosensitive element, and a spacing distance TTL from an object-side surface of the first lens to an imaging surface of the electronic photosensitive element on the optical axis and ImgH satisfy TTL/ImgH<1.5. More specifically, a ratio of the spacing distance TTL to ImgH is 1.24. Such a setting is favorable for ensuring an ultra-thin characteristic of the optical imaging lens group.

In the embodiment, an effective focal length f6 of the sixth lens and an effective focal length f7 of the seventh lens satisfy −2<f6/f7<−1. More specifically, the effective focal length f6 of the sixth lens and the effective focal length f7 of the seventh lens may satisfy −1.9<f6/f7<−1.2. Such a setting may control spherical aberration contributions of the seventh lens E7 and the sixth lens E6 reasonably in a reasonable range, and is favorable for ensuring high imaging quality in the on-axis field of view.

In the embodiment, a curvature radius R2 of an image-side surface of the first lens, a curvature radius R3 of an object-side surface of the second lens, and a spacing distance T12 between the first lens and the second lens on the optical axis satisfy |R2−R3|/T12<12. More specifically, the curvature radius R2 of the image-side surface of the first lens, the curvature radius R3 of the object-side surface of the second lens and the spacing distance T12 between the first lens and the second lens on the optical axis satisfy 1.6<|R2−R3|/T12<10.7. Such a setting may control a shape of the first lens E1 and a distance between the first lens E1 and the second lens E2 effectively to ensure that the shapes of the first lens E1 and the second lens E2 may complement each other better to improve the spherical aberration and further improve the imaging quality of the optical imaging lens group.

In the embodiment, a curvature radius R11 of an object-side surface of the sixth lens and the effective focal length f of the optical imaging lens group satisfy R11/f<0.5. More specifically, the curvature radius R11 of the object-side surface of the sixth lens and the effective focal length f of the optical imaging lens group satisfy 0.3<R11/f<0.5. Such a setting is favorable for distributing the refractive power of the sixth lens E6 reasonably, controlling the spherical aberration contribution of the sixth lens E6 in the reasonable range, and correcting the spherical aberration, and ensures the imaging quality of the optical imaging lens group in the on-axis field of view.

In the embodiment, a center thickness CT3 of the third lens on the optical axis and a center thickness CT4 of the fourth lens on the optical axis satisfy 100*|CT3−CT4|<10. More specifically, the center thickness CT3 of the third lens on the optical axis and the center thickness CT4 of the fourth lens on the optical axis satisfy 0<100*|CT3−CT4|<3.6. Such a setting may control shapes of the third lens E3 and the fourth lens E4 effectively to make thicknesses of the third lens E3 and the fourth lens E4 more uniform for convenient forming and machining.

In the embodiment, a spacing distance T45 between the fourth lens and the fifth lens on the optical axis and a spacing distance T56 between the fifth lens and the sixth lens on the optical axis satisfy T45/T56<1.5. More specifically, the spacing distance T45 between the fourth lens and the fifth lens on the optical axis and the spacing distance T56 between the fifth lens and the sixth lens on the optical axis satisfy 0.4<T45/T56<1.2. Such a setting ensures reasonable distribution of the fourth lens E4, the fifth lens E5 and the sixth lens E6 in the optical imaging lens group, and is favorable for reducing an assembling segment gap between the lenses for convenient assembling.

In the embodiment, a spacing distance T67 between the sixth lens and the seventh lens on the optical axis and a spacing distance TD between the object-side surface of the first lens and the image-side surface of the seventh lens satisfy 1<T67/TD<2. More specifically, the spacing distance T67 between the sixth lens and the seventh lens on the optical axis and the spacing distance TD between the object-side surface of the first lens and the image-side surface of the seventh lens satisfy 1.3<T67/TD<1.5. Such a setting may control reasonable distribution of each lens in the optical imaging lens group effectively for convenient assembling.

In the embodiment, an on-axis spacing distance SAG62 from an intersection point of the image-side surface of the sixth lens and the optical axis to an effective radius vertex of the image-side surface of the sixth lens and a center thickness CT6 of the sixth lens on the optical axis satisfy −1.5<SAG62/CT6<−0.9. More specifically, the on-axis spacing distance SAG62 from the intersection point of the image-side surface of the sixth lens and the optical axis to the effective radius vertex of the image-side surface of the sixth lens and the center thickness CT6 of the sixth lens on the optical axis satisfy −1.2<SAG62/CT6<−1. Such a setting may control an incident angle of a chief ray on the imaging surface S17 in each field of view reasonably to satisfy a Chief Ray Angle (CRA) requirement in optical system design.

In the embodiment, ImgH is a half of the diagonal length of the effective pixel region of the electronic photosensitive element, and an effective semi-diameter DT11 of the object-side surface of the first lens and ImgH satisfy DT11/ImgH<0.4. More specifically, the effective semi-diameter DT11 of the object-side surface of the first lens and ImgH satisfy 0.2<DT11/ImgH<0.4. Such a setting is favorable for enlarging the field of view, and is also favorable for compressing the incident angle of the ray at the diaphragm STO, reducing the pupil aberration, and improving the imaging quality.

In the embodiment, an effective radius DT61 of the object-side surface of the sixth lens, an effective radius DT52 of an image-side surface of the fifth lens, an effective radius DT51 of an object-side surface of the fifth lens and an effective radius DT42 of the image-side surface of the fourth lens satisfy 2<(DT61−DT52)/(DT51−DT42)<20. More specifically, the effective radius DT61 of the object-side surface of the sixth lens, the effective radius DT52 of the image-side surface of the fifth lens, the effective radius DT51 of the object-side surface of the fifth lens and the effective radius DT42 of the image-side surface of the fourth lens satisfy 2.9<(DT61−DT52)/(DT51−DT42)<11.5. Such a setting may restrict apertures diameters of the fourth lens E4, the fifth lens E5 and the sixth lens E6 effectively, ensure that an assembling segment gap of the optical imaging lens group is in a reasonable machining range for convenient forming machining and assembling, and is favorable for achieving a relatively high luminous flux in the off-axis field of view.

In the embodiment, an edge thickness ET5 of the fifth lens and a center thickness CT5 of the fifth lens on the optical axis satisfy 0.8<ET5/CT5<1.2. More specifically, the edge thickness ET5 of the fifth lens and the center thickness CT5 of the fifth lens on the optical axis satisfy 0.8<ET5/CT5<1.1.

Such a setting makes a thickness of the fifth lens E5 more uniform for convenient forming and machining.

In the embodiment, each of the object-side surface S11 of the sixth lens and the image-side surface S12 of the sixth lens has at least one critical point, and a vector height YT61 along the optical axis from the center of the object-side surface of the sixth lens to the critical point of the object-side surface of the sixth lens closest to the optical axis and a vector height YT62 along the optical axis from the center of the image-side surface of the sixth lens to the critical point of the image-side surface of the sixth lens closest to the optical axis satisfy 0.8<YT61/YT62<1.3. More specifically, each of the object-side surface of the sixth lens and the image-side surface of the sixth lens has the at least one critical point, and the vector height YT61 along the optical axis from the center of the object-side surface of the sixth lens to the critical point of the object-side surface of the sixth lens closest to the optical axis and the vector height YT62 along the optical axis from the center of the image-side surface of the sixth lens to the critical point of the image-side surface of the sixth lens closest to the optical axis satisfy 0.9<YT61/YT62<1.2. Such a setting may control a field curvature and distortion of the optical imaging lens group effectively to achieve relatively high imaging quality under different object distances.

In the embodiment, a distance OT from a shot object to the object-side surface of the first lens on the optical axis and the spacing distance TTL from the object-side surface of the first lens to the imaging surface of the electronic photosensitive element on the optical axis satisfy OT/TTL<30. More specifically, the distance OT from the shot object to the object-side surface of the first lens on the optical axis and the spacing distance TTL from the object-side surface of the first lens to the imaging surface of the electronic photosensitive element on the optical axis satisfy 13.8<OT/TTL<27.8. Such a setting may ensure the structural feasibility and relatively low system sensitivity of the optical imaging lens group effectively.

In the embodiment, an abbe number V3 of the third lens and an abbe number V4 of the fourth lens satisfy V3>V4. Such a setting makes it convenient to select a lens material, may further control spherical aberration contributions of the third lens E3 and the fourth lens E4 in a reasonable range reasonably to achieve high imaging quality in the on-axis field of view, and meanwhile, may achieve the characteristic of large image surface to obtain a relatively high luminous flux in the off-axis field of view.

In the embodiment, a maximum distortion DISTmax of the optical imaging lens group satisfies 5%<|DISTmax|<50%. More specifically, the maximum distortion DISTmax of the optical imaging lens group satisfies 7.7%<|DISTmax|<8.1%. Such a setting is favorable for enlarging the field of view to achieve relatively high imaging quality under different object distances.

Embodiment 2

The disclosure provides an optical imaging lens group, which sequentially includes from an object side to an image side along an optical axis of the optical imaging lens group, a first lens with a positive refractive power, a second lens with a refractive power, a third lens with a refractive power, a fourth lens with a refractive power, a fifth lens with a refractive power, a sixth lens with a refractive power, and a seventh lens with a negative refractive power; an image-side surface of the second lens is a concave surface; an image-side surface of the fourth lens is a concave surface; and an image-side surface of the sixth lens is a concave surface. A maximum field of view FOV of the optical imaging lens group and an effective focal length f of the optical imaging lens group satisfy tan(FOV/2)*f>5 mm. A spacing distance T67 between the sixth lens and the seventh lens on the optical axis and a spacing distance TD between an object-side surface of the first lens and an image-side surface of the seventh lens on the optical axis satisfy 1<T67/TD<2.

The refractive power is configured reasonably, so that an astigmatism and a distortion may be reduced effectively, and the imaging quality of the optical imaging lens group may be improved greatly. The first lens E1 has the positive refractive power, the second lens E2 has the refractive power and the image-side surface S4 of the second lens is the concave surface, so that enlargement of a field of view is facilitated, and meanwhile, compression of an incident angle of a ray at a diaphragm STO, reduction of a pupil aberration, and improvement of the imaging quality are facilitated. The third lens E3 has the refractive power, the fourth lens E4 has the refractive power, and the image-side surface S8 of the fourth lens is the concave surface, so that reduction of a spherical aberration and an astigmatism of the optical imaging lens group is facilitated. The fifth lens E5 has the refractive power, the sixth lens E6 has the refractive power, and the image-side surface S12 of the sixth lens is the concave surface, so that the characteristics of compact structure, large aperture and high imaging quality of the optical imaging lens group are ensured favorably, and meanwhile, the optical imaging lens group is easy to machine. The seventh lens E7 has the negative refractive power, so that a spherical aberration contribution may be controlled reasonably in a reasonable range to achieve high imaging quality in an on-axis field of view, and meanwhile, the characteristic of large image surface may be achieved to achieve a relatively high luminous flux in an off-axis field of view. The maximum field of view FOV of the optical imaging lens group and the effective focal length f of the optical imaging lens group satisfy tan(FOV/2)*f>5 mm, so that the characteristic of large image surface of the optical imaging lens group is ensured. The spacing distance T67 between the sixth lens and the seventh lens on the optical axis and the spacing distance TD between the object-side surface of the first lens and the image-side surface of the seventh lens on the optical axis satisfy 1<T67/TD<2, so that reasonable distribution of each lens in the optical imaging lens group may be controlled effectively, and convenience is brought to assembling.

More specifically, the maximum field of view FOV of the optical imaging lens group and the effective focal length f of the optical imaging lens group may satisfy 5.3 mm<tan(FOV/2)*f/5.4 mm.

More specifically, the spacing distance T67 between the sixth lens and the seventh lens on the optical axis and the spacing distance TD between the object-side surface of the first lens and the image-side surface of the seventh lens satisfy 1.3<T67/TD<1.5.

In the embodiment, a curvature radius R12 of the image-side surface of the sixth lens and a curvature radius R14 of the image-side surface of the seventh lens satisfy 1<R12/R14<2. More specifically, the curvature radius R12 of the image-side surface of the sixth lens and the curvature radius R14 of the image-side surface of the seventh lens satisfy 1.1<R12/R14<1.5. A ratio of the curvature radius R12 of the image-side surface of the sixth lens to the curvature radius R14 of the image-side surface of the seventh lens is controlled reasonably, so that an assembling segment gap of the sixth lens E6 and the seventh lens E7 may be controlled effectively in a reasonable range for convenient machining and assembling.

In the embodiment, the optical imaging lens group is arranged on an electronic photosensitive element, and ImgH is a half of a diagonal length of an effective pixel region of the electronic photosensitive element a spacing distance TTL from the object-side surface of the first lens to an imaging surface of the electronic photosensitive element on the optical axis and ImgH satisfy TTL/ImgH<1.5. More specifically, a ratio of the spacing distance TTL from the object-side surface of the first lens to the imaging surface of the electronic photosensitive element on the optical axis to ImgH is 1.24. Such a setting is favorable for ensuring an ultra-thin characteristic of the optical imaging lens group.

In the embodiment, an effective focal length f6 of the sixth lens and an effective focal length f7 of the seventh lens satisfy −2<f6/f7<−1. More specifically, the effective focal length f6 of the sixth lens and the effective focal length f7 of the seventh lens may satisfy −1.9<f6/f7<−1.2. Such a setting may control spherical aberration contributions of the seventh lens E7 and the sixth lens E6 reasonably in a reasonable range, and is favorable for ensuring high imaging quality in an on-axis field of view.

In the embodiment, a curvature radius R2 of an image-side surface of the first lens, a curvature radius R3 of an object-side surface of the second lens and a spacing distance T12 between the first lens and the second lens on the optical axis satisfy |R2−R3|/T12<12. More specifically, the curvature radius R2 of the image-side surface of the first lens, the curvature radius R3 of the object-side surface of the second lens and the spacing distance T12 between the first lens and the second lens on the optical axis satisfy 1.6<|R2−R3|/T12<10.7. Such a setting may control a shape of the first lens E1 and a distance between the first lens E1 and the second lens E2 effectively to ensure that the shapes of the first lens E1 and the second lens E2 may complement each other better to improve the spherical aberration and further improve the imaging quality of the optical imaging lens group.

In the embodiment, a curvature radius R11 of an object-side surface of the sixth lens and the effective focal length f of the optical imaging lens group satisfy R11/f<0.5. More specifically, the curvature radius R11 of the object-side surface of the sixth lens and the effective focal length f of the optical imaging lens group satisfy 0.3<R11/f<0.5. Such a setting is favorable for distributing the refractive power of the sixth lens E6 reasonably, controlling the spherical aberration contribution of the sixth lens E6 in the reasonable range, and correcting the spherical aberration, and ensures the imaging quality of the optical imaging lens group in the on-axis field of view.

In the embodiment, a center thickness CT3 of the third lens on the optical axis and a center thickness CT4 of the fourth lens on the optical axis satisfy 100*|CT3−CT4|<10. More specifically, the center thickness CT3 of the third lens on the optical axis and the center thickness CT4 of the fourth lens on the optical axis satisfy 0<100*|CT3−CT4|<3.6. Such a setting may control shapes of the third lens E3 and the fourth lens E4 effectively to make thicknesses of the third lens E3 and the fourth lens E4 more uniform for convenient forming and machining.

In the embodiment, a spacing distance T45 between the fourth lens and the fifth lens on the optical axis and a spacing distance T56 between the fifth lens and the sixth lens on the optical axis satisfy T45/T56<1.5. More specifically, the spacing distance T45 between the fourth lens and the fifth lens on the optical axis and the spacing distance T56 between the fifth lens and the sixth lens on the optical axis satisfy $0.4<T45/T56<1.2$. Such a setting ensures reasonable distribution of the fourth lens E4, the fifth lens E5 and the sixth lens E6 in the optical imaging lens group, and is favorable for reducing an assembling segment gap between the lenses for convenient assembling.

In the embodiment, an on-axis spacing distance SAG62 from an intersection point of the image-side surface of the sixth lens and the optical axis to an effective radius vertex of the image-side surface of the sixth lens and a center thickness CT6 of the sixth lens on the optical axis satisfy $-1.5<SAG62/CT6<-0.9$. More specifically, the on-axis spacing distance SAG62 from the intersection point of the image-side surface of the sixth lens and the optical axis to the effective radius vertex of the image-side surface of the sixth lens and the center thickness CT6 of the sixth lens on the optical axis satisfy $-1.2<SAG62/CT6<-1$. Such a setting may control an incident angle of a chief ray on the imaging surface S17 in each field of view reasonably to satisfy a CRA requirement in optical system design.

In the embodiment, ImgH is a half of the diagonal length of the effective pixel region of the electronic photosensitive element, and an effective semi-diameter DT11 of the object-side surface of the first lens and ImgH satisfy $DT11/ImgH<0.4$. More specifically, the effective semi-diameter DT11 of the object-side surface of the first lens and ImgH satisfy $0.2<DT11/ImgH<0.4$. Such a setting is favorable for enlarging the field of view, and is also favorable for compressing the incident angle of the ray at the diaphragm STO, reducing the pupil aberration, and improving the imaging quality.

In the embodiment, an effective radius DT61 of the object-side surface of the sixth lens, an effective radius DT52 of an image-side surface of the fifth lens, an effective radius DT51 of an object-side surface of the fifth lens and an effective radius DT42 of the image-side surface of the fourth lens satisfy $2<(DT61-DT52)/(DT51-DT42)<20$. More specifically, the effective radius DT61 of the object-side surface of the sixth lens, the effective radius DT52 of the image-side surface of the fifth lens, the effective radius DT51 of the object-side surface of the fifth lens and the effective radius DT42 of the image-side surface of the fourth lens satisfy $2.9<(DT61-DT52)/(DT51-DT42)<11.5$. Such a setting may restrict apertures diameters of the fourth lens E4, the fifth lens E5 and the sixth lens E6 effectively, ensure that the assembling segment gap of the optical imaging lens group is in a reasonable machining range for convenient forming machining and assembling, and is favorable for achieving a relatively high luminous flux in the off-axis field of view.

In the embodiment, an edge thickness ET5 of the fifth lens and a center thickness CT5 of the fifth lens on the optical axis satisfy $0.8<ET5/CT5<1.2$. More specifically, the edge thickness ET5 of the fifth lens and the center thickness CT5 of the fifth lens on the optical axis satisfy $0.8<ET5/CT5<1.1$. Such a setting makes a thickness of the fifth lens E5 more uniform for convenient forming and machining.

In the embodiment, each of the object-side surface of the sixth lens and the image-side surface of the sixth lens has at least one critical point, and a vector height YT61 along the optical axis from the center of the object-side surface of the sixth lens to the critical point of the object-side surface of the sixth lens closest to the optical axis and a vector height YT62 along the optical axis from the center of the image-side surface of the sixth lens to the critical point of the image-side surface of the sixth lens closest to the optical axis satisfy $0.8<YT61/YT62<1.3$. More specifically, each of the object-side surface of the sixth lens and the image-side surface of the sixth lens has the at least one critical point, and the vector height YT61 along the optical axis from the center of the object-side surface of the sixth lens to the critical point of the object-side surface of the sixth lens closest to the optical axis and the vector height YT62 along the optical axis from the center of the image-side surface of the sixth lens to the critical point of the image-side surface of the sixth lens closest to the optical axis satisfy $0.9<YT61/YT62<1.2$. Such a setting may control a field curvature and distortion of the optical imaging lens group effectively to achieve relatively high imaging quality under different object distances.

In the embodiment, a distance OT from a shot object to the object-side surface of the first lens on the optical axis and the spacing distance TTL from the object-side surface of the first lens to the imaging surface of the electronic photosensitive element on the optical axis satisfy $OT/TTL<30$. More specifically, the distance OT from the shot object to the object-side surface of the first lens on the optical axis and the spacing distance TTL from the object-side surface of the first lens to the imaging surface of the electronic photosensitive element on the optical axis satisfy $13.8<OT/TTL<27.8$. Such a setting may ensure the structural feasibility and relatively low system sensitivity of the optical imaging lens group effectively.

In the embodiment, an abbe number V3 of the third lens and an abbe number V4 of the fourth lens satisfy $V3>V4$. Such a setting makes it convenient to select a lens material, may further control spherical aberration contributions of the third lens E3 and the fourth lens E4 in a reasonable range reasonably to achieve high imaging quality in the on-axis field of view, and meanwhile, may achieve the characteristic of large image surface to obtain a relatively high luminous flux in the off-axis field of view.

In the embodiment, a maximum distortion DISTmax of the optical imaging lens group satisfies $5%<|DISTmax|<50%$. More specifically, the maximum distortion DISTmax of the optical imaging lens group satisfies $7.7%<|DISTmax|<8.1%$. Such a setting is favorable for enlarging the field of view to achieve relatively high imaging quality under different object distances.

The optical imaging lens group may further include at least one diaphragm STO, to improve the imaging quality of the optical imaging lens group. Optionally, the diaphragm STO may be arranged before the first lens E1. Optionally, the optical imaging lens group may further include an optical filter E8 configured to correct a chromatic aberration and/or protective glass configured to protect a photosensitive element on the imaging surface.

The optical imaging lens group in the disclosure may adopt multiple lenses, for example, the abovementioned seven. The refractive power and surface types of each lens, the center thickness of each lens, on-axis distances between the lenses and the like are reasonably configured to effectively enlarge an aperture of the optical imaging lens group, reduce the sensitivity of the optical imaging lens group, improve the machinability of the optical imaging lens group, and ensure that the optical imaging lens group is more favorable for production and machining and applicable to a portable electronic device. The optical imaging lens group also has the advantages of large aperture, ultra-thin design, and high imaging quality, and may satisfy a miniaturization requirement of an intelligent electronic product.

In the disclosure, at least one of mirror surfaces of the lenses is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible, thereby improving the imaging quality.

However, those skilled in the art should know that the number of the lenses forming the optical imaging lens group may be changed without departing from the technical solutions claimed in the disclosure to achieve each result and advantage described in the specification. For example, although descriptions are made in the implementation mode with seven lenses as an example, the optical imaging lens group is not limited to seven lenses. If necessary, the optical imaging lens group may further include another number of lenses.

Examples of specific surface types and parameters applied to the optical imaging lens group of the abovementioned embodiment will further be described below with reference to the drawings.

It is to be noted that any one of following Example 1 to Example 6 is applied to all embodiments of the disclosure.

Example 1

Figure 14:
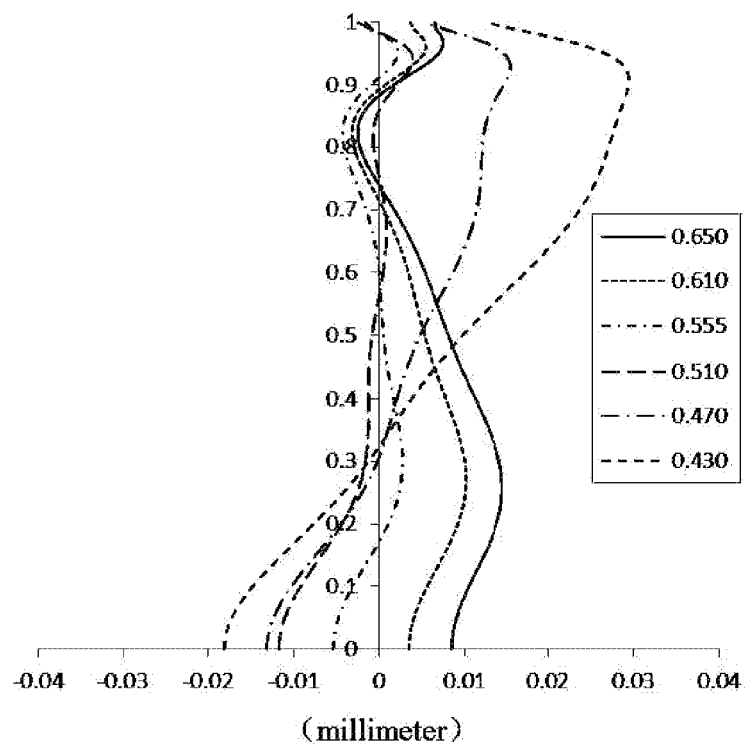
FIGS. 14-16 show a longitudinal aberration curve, an astigmatism curve and a distortion curve of the optical imaging lens group in FIG. 13 respectively.

As shown in FIGS. 14, an optical imaging lens group according to Example 1 of the disclosure is described. FIG. 1 shows a structural schematic diagram of an optical imaging lens group according to Example 1.

As shown in FIG. 1, the optical imaging lens group sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a concave surface. The fourth lens E4 has a negative refractive power, an object-side surface S7 of the fourth lens is a concave surface, and an image-side surface S8 of the fourth lens is a concave surface. The fifth lens E5 has a negative refractive power, an object-side surface S9 of the fifth lens is a concave surface, and an image-side surface S10 of the fifth lens is a convex surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens group is 6.06 mm, a maximum field of view FOV of the optical imaging lens group is 83.23°, a spacing distance TTL from the object-side surface of the first lens to the imaging surface of the electronic photosensitive element on an optical axis is 7.20 mm, and ImgH is a half of a diagonal length of an effective pixel region of the electronic photosensitive element, and ImgH is 5.80 mm.

Table 1 shows a basic structural parameter table of the optical imaging lens group of Example 1, wherein the units of the curvature radius, the thickness/distance and the focal length are all millimeters (mm).

TABLE 1

| Surface number | Surface type | Curvature radius | Thickness | Refractive index | Abbe number | Conic coefficient |
|---|---|---|---|---|---|---|
| OBJ | Spherical | Infinite | 200.0000 | | | |
| STO | Spherical | Infinite | −0.5522 | | | |
| S1 | Aspheric | 2.4237 | 1.0000 | 1.55 | 56.1 | −5.9461 |
| S2 | Aspheric | 10.9119 | 0.1000 | | | −22.2610 |
| S3 | Aspheric | 10.5197 | 0.3150 | 1.68 | 19.2 | 37.5692 |
| S4 | Aspheric | 5.2687 | 0.3157 | | | −5.3904 |
| S5 | Aspheric | 11.0440 | 0.3952 | 1.55 | 56.1 | 16.7386 |
| S6 | Aspheric | 40.9849 | 0.3473 | | | 93.1011 |
| S7 | Aspheric | −808.3009 | 0.4000 | 1.67 | 20.4 | 99.0000 |
| S8 | Aspheric | 21.8862 | 0.3093 | | | 55.7837 |
| S9 | Aspheric | −12.3863 | 0.5500 | 1.62 | 25.9 | −99.0000 |
| S10 | Aspheric | −20.1380 | 0.4301 | | | −87.2081 |
| S11 | Aspheric | 2.4022 | 0.7100 | 1.54 | 55.7 | −0.9485 |
| S12 | Aspheric | 3.7785 | 0.8991 | | | −0.0259 |
| S13 | Aspheric | 317.7364 | 0.5800 | 1.54 | 55.7 | 99.0000 |
| S14 | Aspheric | 3.3537 | 0.4413 | | | −1.0000 |
| S15 | Spherical | Infinite | 0.2100 | 1.52 | 64.2 | |
| S16 | Spherical | Infinite | 0.1929 | | | |
| S17 | Spherical | Infinite | | | | |

In Example 1, both the object-side surface and the image-side surface of any lens in the first lens E1 to the seventh lens E7 are aspheric surfaces, and a surface type of each aspheric lens may be defined through, but not limited to, the following aspheric surface formula:

$$x = \frac{ch^2}{1 + \sqrt{1 - (k+1)c^2h^2}} + \Sigma\, Aih, \qquad (1)$$

wherein x is a vector height of a distance between the aspheric surface and a vertex of the aspheric surface when the aspheric surface is located at a position with the height h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18, A20, A22, A24, A26, A28, and A30 applied to each of the aspheric mirror surfaces S1-S14 in Example 1.

TABLE 2

| Surface number | A4 | A6 | A8 | A10 | A12 | A14 | A16 |
|---|---|---|---|---|---|---|---|
| S1 | 5.1531E−02 | −1.7447E−02 | 9.3976E−03 | −5.8368E−03 | 3.6571E−03 | −1.9154E−03 | 6.7478E−04 |
| S2 | −1.6750E−02 | 6.1939E−03 | 1.6725E−02 | −4.5884E−02 | 5.7758E−02 | −4.3007E−02 | 1.9038E−02 |
| S3 | −3.0617E−02 | 1.9644E−02 | 2.5476E−03 | −2.4200E−02 | 3.2986E−02 | −2.5141E−02 | 1.1469E−02 |
| S4 | −9.1964E−03 | 1.8824E−02 | −1.5736E−02 | 1.9437E−02 | −2.3801E−02 | 2.0943E−02 | −1.1363E−02 |
| S5 | −1.5020E−02 | 8.8621E−03 | −3.2122E−02 | 6.1395E−02 | −7.7110E−02 | 6.0118E−02 | −2.8372E−02 |
| S6 | −1.2225E−02 | −1.1950E−02 | 3.5563E−02 | −6.7280E−02 | 7.5449E−02 | −5.3058E−02 | 2.2572E−02 |
| S7 | −4.0363E−02 | 2.5113E−02 | −9.4266E−02 | 1.6952E−01 | −1.7990E−01 | 1.1752E−01 | −4.6695E−02 |
| S8 | −3.1486E−02 | 2.2657E−02 | −6.0999E−02 | 7.5954E−02 | −5.6670E−02 | 2.6315E−02 | −7.4876E−03 |
| S9 | −3.4598E−02 | 5.0819E−02 | −7.3563E−02 | 6.4323E−02 | −3.8027E−02 | 1.4934E−02 | −3.7520E−03 |
| S10 | −7.7211E−02 | 6.2768E−02 | −4.4706E−02 | 2.2756E−02 | −7.7817E−03 | 1.7184E−03 | −2.3165E−04 |
| S11 | −6.8844E−02 | 3.1896E−02 | −2.5821E−02 | 2.0055E−02 | −1.2905E−02 | 6.1090E−03 | −2.0534E−03 |
| S12 | −4.4862E−03 | −1.6169E−02 | 1.2486E−02 | −6.7399E−03 | 2.3746E−03 | −5.4755E−04 | 8.1693E−05 |
| S13 | −5.5616E−02 | 5.3226E−03 | 4.8394E−03 | −2.4407E−03 | 5.7141E−04 | −8.1539E−05 | 7.7038E−06 |
| S14 | −6.1708E−02 | 1.2052E−02 | −9.9971E−04 | −3.5476E−04 | 1.6047E−04 | −3.2888E−05 | 4.3092E−06 |

| Surface number | A18 | A20 | A22 | A24 | A26 | A28 | A30 |
|---|---|---|---|---|---|---|---|
| S1 | −1.3763E−04 | 1.1947E−05 | 0.0000E+00 | 0.0000E+00 | 0.0000E+00 | 0.0000E+00 | 0.0000E+00 |
| S2 | −4.6076E−03 | 4.6731E−04 | 0.0000E+00 | 0.0000E+00 | 0.0000E+00 | 0.0000E+00 | 0.0000E+00 |
| S3 | −2.8694E−03 | 2.9790E−04 | 0.0000E+00 | 0.0000E+00 | 0.0000E+00 | 0.0000E+00 | 0.0000E+00 |
| S4 | 3.4713E−03 | −4.5176E−04 | 0.0000E+00 | 0.0000E+00 | 0.0000E+00 | 0.0000E+00 | 0.0000E+00 |
| S5 | 7.4965E−03 | −8.3875E−04 | 0.0000E+00 | 0.0000E+00 | 0.0000E+00 | 0.0000E+00 | 0.0000E+00 |
| S6 | −5.2885E−03 | 5.2931E−04 | 0.0000E+00 | 0.0000E+00 | 0.0000E+00 | 0.0000E+00 | 0.0000E+00 |
| S7 | 1.0330E−02 | −9.7366E−04 | 0.0000E+00 | 0.0000E+00 | 0.0000E+00 | 0.0000E+00 | 0.0000E+00 |
| S8 | 1.1935E−03 | −8.0845E−05 | 0.0000E+00 | 0.0000E+00 | 0.0000E+00 | 0.0000E+00 | 0.0000E+00 |
| S9 | 5.4290E−04 | −3.3939E−05 | 0.0000E+00 | 0.0000E+00 | 0.0000E+00 | 0.0000E+00 | 0.0000E+00 |
| S10 | 1.7213E−05 | −5.3937E−07 | 0.0000E+00 | 0.0000E+00 | 0.0000E+00 | 0.0000E+00 | 0.0000E+00 |
| S11 | 4.8961E−04 | −8.2918E−05 | 9.8926E−06 | −8.1174E−07 | 4.3559E−08 | −1.3753E−09 | 1.9366E−11 |
| S12 | −7.2587E−06 | 2.3361E−07 | 2.5465E−08 | −3.7657E−09 | 2.2138E−10 | −6.5777E−12 | 8.1099E−14 |
| S13 | −4.9790E−07 | 2.2131E−08 | −6.6422E−10 | 1.2808E−11 | −1.4224E−13 | 6.8330E−16 | 0.0000E+00 |
| S14 | −3.9507E−07 | 2.6197E−08 | −1.2618E−09 | 4.3278E−11 | −1.0044E−12 | 1.4145E−14 | −9.1169E−17 |

Figure 2:
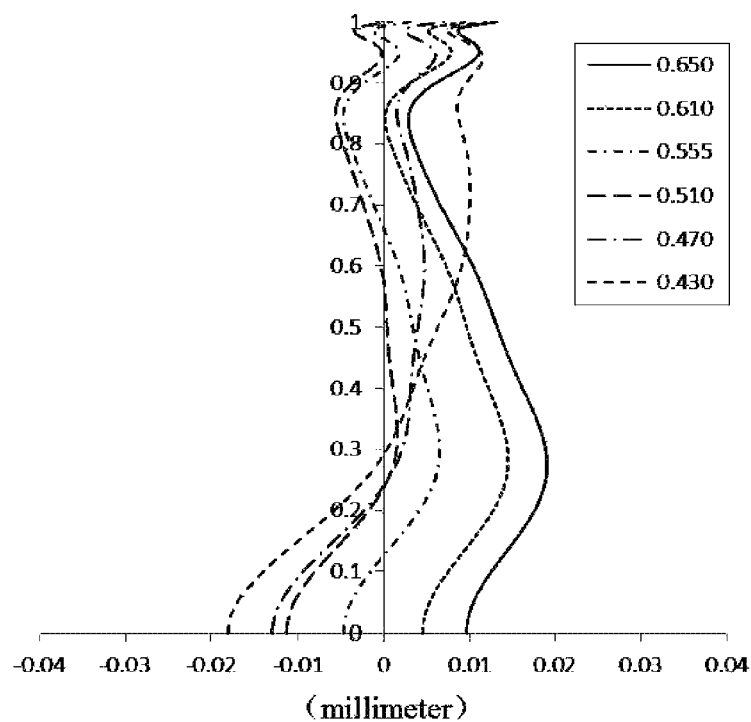
FIGS. 2-4 show a longitudinal aberration curve, an astigmatism curve and a distortion curve of the optical imaging lens group in FIG. 1 respectively.
Figure 3:
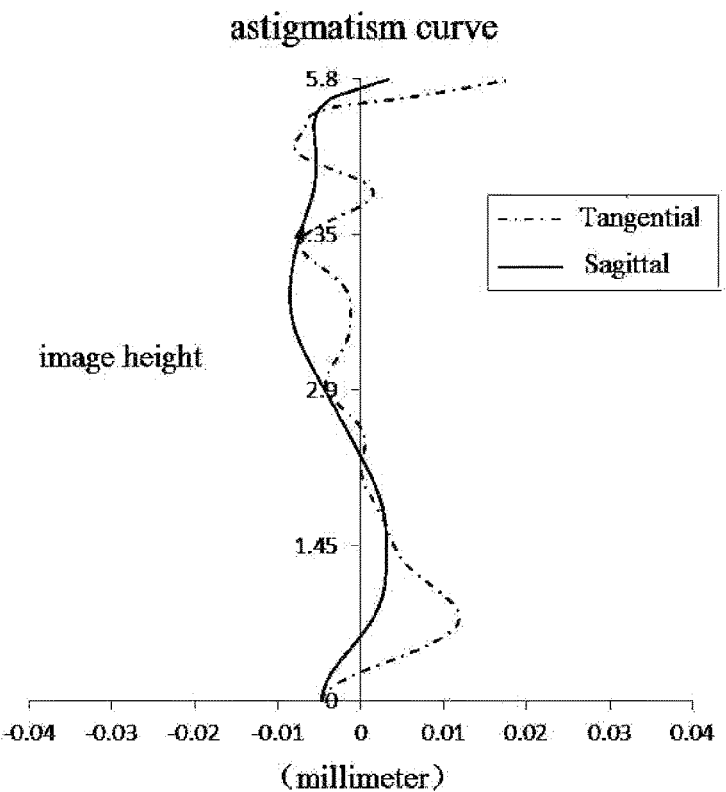
Figure 4:
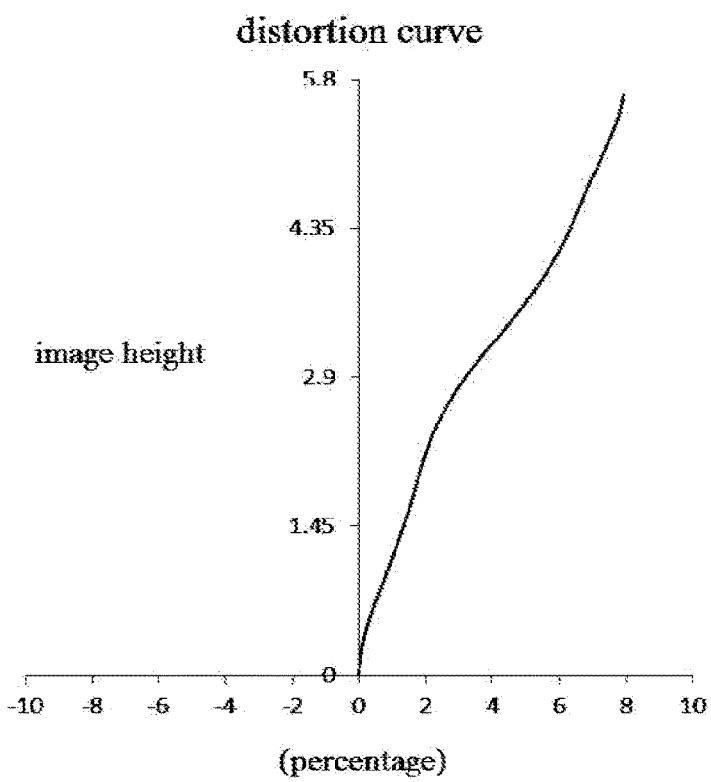

FIG. 2 shows a longitudinal aberration curve of the optical imaging lens group according to Example 1 to represent a deviation of a convergence focal point after light with different wavelengths passes through the optical imaging lens group. FIG. 3 shows an astigmatism curve of the optical imaging lens group according to Example 1 to represent a curvature of tangential image surface and a curvature of sagittal image surface. FIG. 4 shows a distortion curve of the optical imaging lens group according to Example 1 to represent distortion values corresponding to different field of views.

According to FIGS. 2-4, it can be seen that the optical imaging lens group provided in Example 1 may achieve high imaging quality.

Example 2

Figure 5:
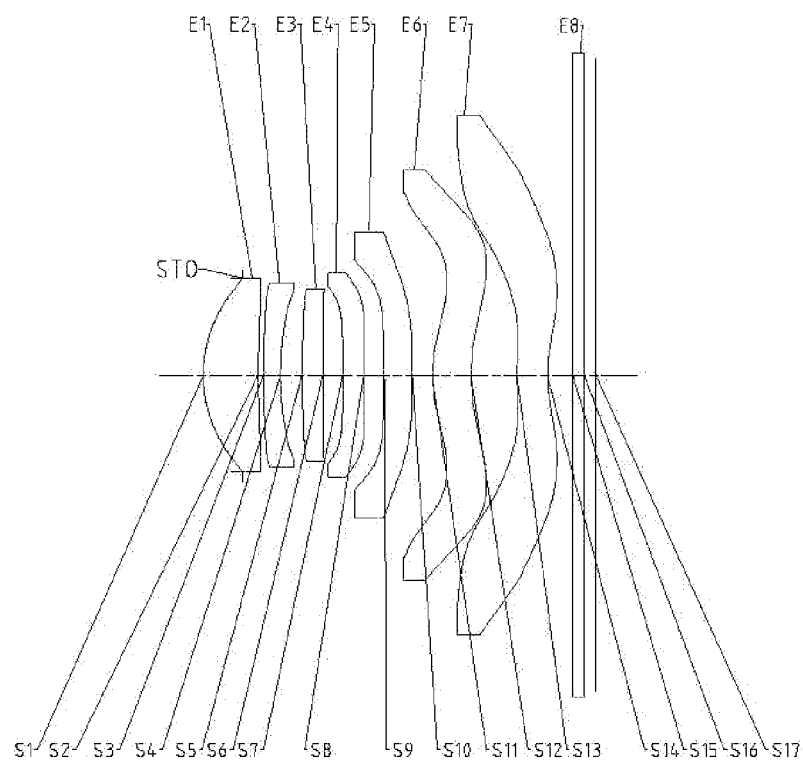
FIG. 5 shows a structural schematic diagram of an optical imaging lens group according to Example 2 of the disclosure.

As shown in FIGS. 5-8, an optical imaging lens group according to Example 2 of the disclosure is described. In the example and the following examples, parts of description similar to those in Example 1 are omitted for simplicity. FIG. 5 shows a structural schematic diagram of an optical imaging lens group according to Example 2.

As shown in FIG. 5, the optical imaging lens group sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens E1 is a concave surface. The second lens E2 has a negative refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a concave surface. The fourth lens E4 has a negative refractive power, an object-side surface S7 of the fourth lens is a convex surface, and an image-side surface S8 of the fourth lens is a concave surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens group is 6.04 mm, a maximum field of view FOV of the optical imaging lens group is 83.20°, a spacing distance TTL from the object-side surface of the first lens to the imaging surface of the electronic photosensitive element on an optical axis is 7.20 mm, and ImgH is a half of a diagonal length of an effective pixel region of the electronic photosensitive element, and ImgH is 5.80 mm.

Table 3 shows a basic structural parameter table of the optical imaging lens group of Example 2, wherein the units of the curvature radius, the thickness/distance and the focal length are all millimeters (mm).

TABLE 3

| Surface number | Surface type | Curvature radius | Thickness | Material Refractive index | Abbe number | Conic coefficient |
|---|---|---|---|---|---|---|
| OBJ | Spherical | Infinite | 100.0000 | | | |
| STO | Spherical | Infinite | −0.7277 | | | |
| S1 | Aspheric | 2.4365 | 1.0000 | 1.55 | 56.1 | −5.9106 |
| S2 | Aspheric | 10.6543 | 0.1000 | | | −19.0723 |
| S3 | Aspheric | 10.4882 | 0.3150 | 1.68 | 19.2 | 22.5685 |
| S4 | Aspheric | 5.3675 | 0.3922 | | | −9.5306 |
| S5 | Aspheric | 11.7930 | 0.3844 | 1.55 | 56.1 | 36.4079 |
| S6 | Aspheric | 26.0196 | 0.3625 | | | −98.7268 |
| S7 | Aspheric | 27.5861 | 0.3900 | 1.67 | 20.4 | 0.0000 |
| S8 | Aspheric | 13.3758 | 0.3748 | | | 0.0000 |
| S9 | Aspheric | −49.7481 | 0.5100 | 1.62 | 25.9 | 0.0000 |
| S10 | Aspheric | 42.0520 | 0.3664 | | | 0.0000 |
| S11 | Aspheric | 2.3421 | 0.7100 | 1.54 | 55.7 | −1.0000 |
| S12 | Aspheric | 3.6383 | 0.8427 | | | −1.0000 |
| S13 | Aspheric | 6.8847 | 0.5600 | 1.54 | 55.7 | 0.0000 |
| S14 | Aspheric | 2.4922 | 0.4671 | | | −1.0000 |
| S15 | Spherical | Infinite | 0.2100 | 1.52 | 64.2 | |
| S16 | Spherical | Infinite | 0.2150 | | | |
| S17 | Spherical | Infinite | | | | |

Table 4 shows high-order coefficients applied to each of aspheric mirror surfaces in Example 2, wherein a surface type of each of aspheric surfaces may be defined by formula (1) given in Example 1.

TABLE 4

| Surface number | A4 | A6 | A8 | A10 | A12 | A14 | A16 |
|---|---|---|---|---|---|---|---|
| S1 | 5.0693E−02 | −1.5776E−02 | 6.5183E−03 | −1.3002E−03 | −6.1350E−04 | 6.0090E−04 | −2.1430E−04 |
| S2 | −2.2478E−02 | 1.4715E−02 | −8.4718E−04 | −8.6110E−03 | 9.2366E−03 | −5.1493E−03 | 1.6479E−03 |
| S3 | −3.9926E−02 | 2.6431E−02 | −3.2902E−03 | −1.2325E−02 | 1.4277E−02 | −8.2429E−03 | 2.7407E−03 |
| S4 | −1.1586E−02 | 1.5431E−02 | −1.3896E−03 | −8.1606E−03 | 8.1252E−03 | −3.1662E−03 | 1.5871E−04 |
| S5 | −1.2790E−02 | −3.6101E−03 | 8.4011E−03 | −1.3483E−02 | 1.1773E−02 | −6.1876E−03 | 1.9221E−03 |
| S6 | −7.9619E−03 | −7.3627E−03 | 2.2439E−02 | −3.9331E−02 | 4.1653E−02 | −2.7657E−02 | 1.1236E−02 |
| S7 | −3.2648E−02 | 6.2988E−03 | −3.7521E−02 | 7.0306E−02 | −7.3557E−02 | 4.5634E−02 | −1.6844E−02 |
| S8 | −2.6260E−02 | 9.4983E−04 | −1.5665E−02 | 2.2822E−02 | −1.7770E−02 | 8.0378E−03 | −2.1389E−03 |
| S9 | −1.9880E−02 | 9.6674E−03 | −7.4287E−03 | 9.3695E−04 | 1.7293E−03 | −1.3938E−03 | 5.1302E−04 |
| S10 | −7.5722E−02 | 4.8227E−02 | −2.6568E−02 | 1.0558E−02 | −2.8000E−03 | 4.7323E−04 | −4.7765E−05 |
| S11 | −6.3098E−02 | 7.4424E−03 | 1.2702E−02 | −1.5153E−02 | 8.7077E−03 | −3.2334E−03 | 8.4332E−04 |
| S12 | −9.9562E−04 | −3.2853E−02 | 3.5035E−02 | −2.2277E−02 | 9.3188E−03 | −2.7132E−03 | 5.6611E−04 |
| S13 | −7.3690E−02 | −9.0422E−03 | 1.8965E−02 | −7.8644E−03 | 1.7798E−03 | −2.5624E−04 | 2.4839E−05 |
| S14 | −7.6582E−02 | 8.7221E−03 | 2.0556E−03 | −9.9963E−04 | 1.8405E−04 | −2.0229E−05 | 1.5782E−06 |

| Surface number | A18 | A20 | A22 | A24 | A26 | A28 | A30 |
|---|---|---|---|---|---|---|---|
| S1 | 3.6597E−05 | −2.6225E−06 | 0.0000E+00 | 0.0000E+00 | 0.0000E+00 | 0.0000E+00 | 0.0000E+00 |
| S2 | −2.8347E−04 | 2.0163E−05 | 0.0000E+00 | 0.0000E+00 | 0.0000E+00 | 0.0000E+00 | 0.0000E+00 |
| S3 | −4.8823E−04 | 3.5612E−05 | 0.0000E+00 | 0.0000E+00 | 0.0000E+00 | 0.0000E+00 | 0.0000E+00 |
| S4 | 2.6332E−04 | −5.7143E−05 | 0.0000E+00 | 0.0000E+00 | 0.0000E+00 | 0.0000E+00 | 0.0000E+00 |
| S5 | −2.6004E−04 | 4.4567E−06 | 0.0000E+00 | 0.0000E+00 | 0.0000E+00 | 0.0000E+00 | 0.0000E+00 |
| S6 | −2.5267E−03 | 2.4413E−04 | 0.0000E+00 | 0.0000E+00 | 0.0000E+00 | 0.0000E+00 | 0.0000E+00 |
| S7 | 3.3906E−03 | −2.7874E−04 | −1.9956E−06 | 0.0000E+00 | 0.0000E+00 | 0.0000E+00 | 0.0000E+00 |
| S8 | 3.0619E−04 | −1.6940E−05 | −1.6637E−07 | −3.7459E−09 | 0.0000E+00 | 0.0000E+00 | 0.0000E+00 |
| S9 | −1.0699E−04 | 1.1534E−05 | −2.4960E−07 | −3.9284E−08 | 0.0000E+00 | 0.0000E+00 | 0.0000E+00 |
| S10 | 2.5292E−06 | −4.6989E−08 | −4.2496E−11 | 0.0000E+00 | 0.0000E+00 | 0.0000E+00 | 0.0000E+00 |
| S11 | −1.5884E−04 | 2.1655E−05 | −2.1084E−06 | 1.4239E−07 | −6.3198E−09 | 1.6550E−10 | −1.9357E−12 |
| S12 | −8.5698E−05 | 9.4073E−06 | −7.3937E−07 | 4.0452E−08 | −1.4602E−09 | 3.1217E−11 | −2.9899E−13 |
| S13 | −1.6482E−06 | 7.3574E−08 | −2.0533E−09 | 2.7197E−11 | 1.8316E−13 | −1.1453E−14 | 1.1589E−16 |
| S14 | −1.0369E−07 | 6.3226E−09 | −3.2953E−10 | 1.2665E−11 | −3.1954E−13 | 4.6658E−15 | −2.9816E−17 |

Figure 6:
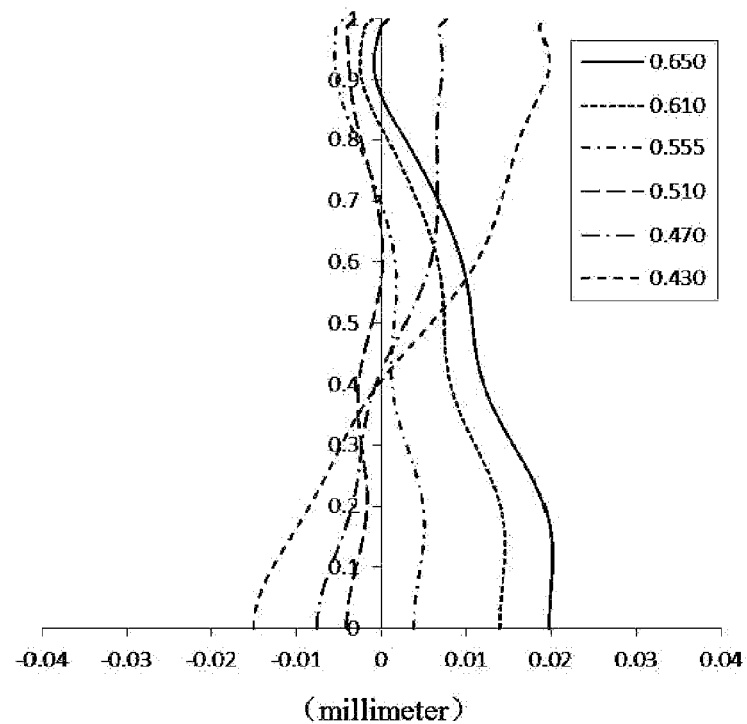
FIGS. 6-8 show a longitudinal aberration curve, an astigmatism curve and a distortion curve of the optical imaging lens group in FIG. 5 respectively.
Figure 7:
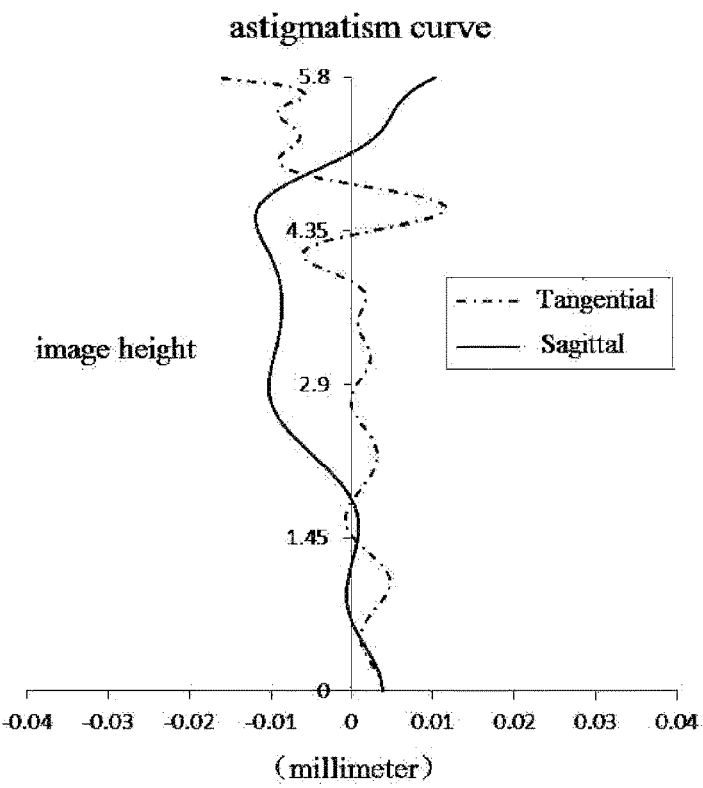
Figure 8:
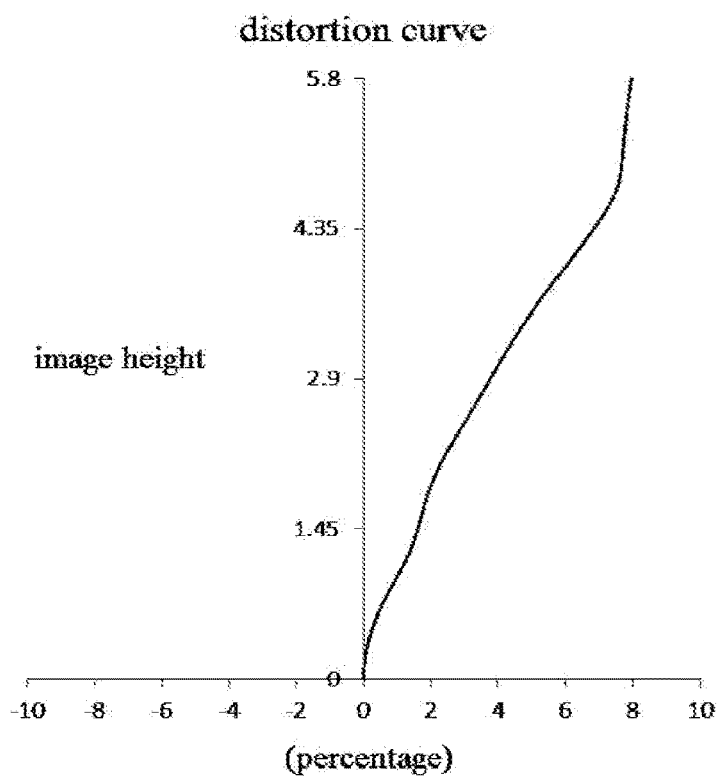

FIG. 6 shows a longitudinal aberration curve of the optical imaging lens group according to Example 2 to represent a deviation of a convergence focal point after light with different wavelengths passes through the optical imaging lens group. FIG. 7 shows an astigmatism curve of the optical imaging lens group according to Example 2 to represent a curvature of tangential image surface and a curvature of sagittal image surface. FIG. 8 shows a distortion curve of the optical imaging lens group according to Example 2 to represent distortion values corresponding to different field of views.

According to FIGS. 6-8, it can be seen that the optical imaging lens group provided in Example 2 may achieve high imaging quality.

Example 3

Figure 9:
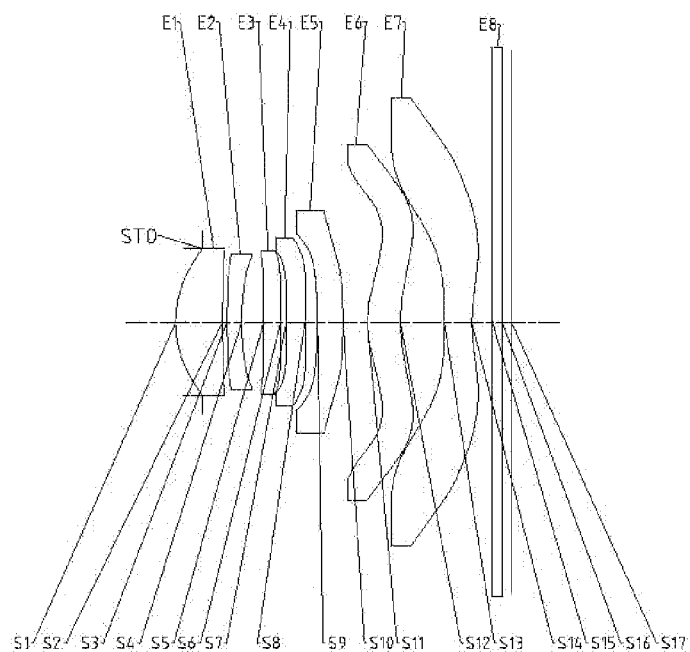
FIG. 9 shows a structural schematic diagram of an optical imaging lens group according to Example 3 of the disclosure.

As shown in FIGS. 9-12, an optical imaging lens group according to Example 3 of the disclosure is described. In the example and the following examples, parts of description similar to those in Example 1 are omitted for simplicity. FIG. 9 shows a structural schematic diagram of an optical imaging lens group according to Example 3.

As shown in FIG. 9, the optical imaging lens group sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a negative refractive power, an object-side surface S5 of the third lens is a convex surface, and an image-side surface S6 of the third lens is a concave surface. The fourth lens E4 has a negative refractive power, an object-side surface S7 of the fourth lens is a convex surface, and an image-side surface S8 of the fourth lens is a concave surface. The fifth lens E5 has a negative refractive power, an object-side surface S9 of the fifth lens is a concave surface, and an image-side surface S10 of the fifth lens is a convex surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens group is 6.06 mm, a maximum field of view FOV of the optical imaging lens group is 83.15°, a spacing distance TTL from the object-side surface of the first lens to the imaging surface of the electronic photosensitive element on an optical axis is 7.20 mm, and ImgH is a half of a diagonal length of an effective pixel region of the electronic photosensitive element, and ImgH is 5.80 mm.

Table 5 shows a basic structural parameter table of the optical imaging lens group of Example 3, wherein the units of the curvature radius, the thickness/distance and the focal length are all millimeters (mm).

TABLE 5

| Surface number | Surface type | Curvature radius | Thickness | Refractive index | Abbe number | Conic coefficient |
|---|---|---|---|---|---|---|
| OBJ | Spherical | Infinite | 200.0000 | | | |
| STO | Spherical | Infinite | −0.5803 | | | |

TABLE 5-continued

| Surface number | Surface type | Curvature radius | Thickness | Refractive index | Abbe number | Conic coefficient |
|---|---|---|---|---|---|---|
| S1 | Aspheric | 2.3510 | 1.0000 | 1.55 | 56.1 | −5.5411 |
| S2 | Aspheric | 10.9717 | 0.1000 | | | −42.6168 |
| S3 | Aspheric | 10.7998 | 0.3150 | 1.68 | 19.2 | 38.4842 |
| S4 | Aspheric | 5.5331 | 0.4693 | | | −2.9177 |
| S5 | Aspheric | 47.8939 | 0.3654 | 1.55 | 56.1 | −80.7929 |
| S6 | Aspheric | 31.2930 | 0.1009 | | | −99.0000 |
| S7 | Aspheric | 15.7097 | 0.4005 | 1.67 | 20.4 | −99.0000 |
| S8 | Aspheric | 13.2123 | 0.2874 | | | −7.5508 |
| S9 | Aspheric | −18.2177 | 0.5500 | 1.62 | 25.9 | −40.3825 |
| S10 | Aspheric | −95.2441 | 0.5175 | | | −98.9442 |
| S11 | Aspheric | 2.2812 | 0.7100 | 1.54 | 55.7 | −0.9309 |
| S12 | Aspheric | 3.9184 | 0.9402 | | | −0.0342 |
| S13 | Aspheric | 75.5752 | 0.5900 | 1.54 | 55.7 | 9.3642 |
| S14 | Aspheric | 3.2202 | 0.4442 | | | −0.9918 |
| S15 | Spherical | Infinite | 0.2100 | 1.52 | 64.2 | |
| S16 | Spherical | Infinite | 0.1957 | | | |
| S17 | Spherical | Infinite | | | | |

Table 6 shows high-order coefficients applied to each of aspheric mirror surfaces in Example 3, wherein a surface type of each of aspheric surfaces may be defined by formula (1) given in Example 1.

TABLE 6

| Surface number | A4 | A6 | A8 | A10 | A12 | A14 | A16 |
|---|---|---|---|---|---|---|---|
| S1 | 5.3026E−02 | −1.5086E−02 | 3.8220E−03 | 2.9163E−03 | −4.6082E−03 | 2.8957E−03 | −1.0116E−03 |
| S2 | −2.2611E−02 | 1.5626E−02 | −1.0625E−02 | 9.3788E−03 | −8.5049E−03 | 5.0557E−03 | −1.7733E−03 |
| S3 | −3.7897E−02 | 2.6555E−02 | −1.1420E−02 | 7.9932E−03 | −9.4414E−03 | 7.7022E−03 | −3.4985E−03 |
| S4 | −1.1056E−02 | 2.4650E−02 | −2.9692E−02 | 4.9161E−02 | −5.8408E−02 | 4.3766E−02 | −1.9564E−02 |
| S5 | −1.1404E−02 | 3.5198E−03 | −4.7971E−02 | 5.5251E−03 | −1.5519E−02 | 1.9502E−02 | −1.2425E−02 |
| S6 | −3.4012E−02 | 1.1397E−02 | 9.1799E−03 | −2.6263E−02 | 2.6989E−02 | −1.6876E−02 | 6.4267E−03 |
| S7 | −4.9673E−02 | 1.6901E−03 | −1.5901E−02 | 4.6995E−02 | −6.0361E−02 | 4.4574E−02 | −1.9604E−02 |
| S8 | −2.7227E−02 | 1.4331E−03 | −1.5920E−02 | 2.0226E−02 | −1.4282E−02 | 6.3223E−03 | −1.7856E−03 |
| S9 | −4.2640E−02 | 6.0447E−02 | −7.0567E−02 | 5.5711E−02 | −3.2463E−02 | 1.3213E−02 | −3.5238E−03 |
| S10 | −9.1204E−02 | 7.3652E−02 | −4.7196E−02 | 2.2483E−02 | −7.4897E−03 | 1.6500E−03 | −2.2503E−04 |
| S11 | −6.4739E−02 | 1.5248E−02 | 3.0283E−03 | −7.8680E−03 | 5.2297E−03 | −2.0957E−03 | 5.7175E−04 |
| S12 | −5.1489E−03 | −2.1192E−02 | 2.1364E−02 | −1.3356E−02 | 5.5196E−03 | −1.5868E−03 | 3.2598E−04 |
| S13 | −6.0386E−02 | 5.7981E−03 | 5.9923E−03 | −3.0994E−03 | 7.4200E−04 | −1.0663E−04 | 9.8544E−06 |
| S14 | −6.7304E−02 | 1.6425E−02 | −3.8199E−03 | 1.1209E−03 | −3.3655E−04 | 7.4590E−05 | −1.1299E−05 |

| Surface number | A18 | A20 | A22 | A24 | A26 | A28 | A30 |
|---|---|---|---|---|---|---|---|
| S1 | 1.8691E−04 | −1.4455E−05 | 0.0000E+00 | 0.0000E+00 | 0.0000E+00 | 0.0000E+00 | 0.0000E+00 |
| S2 | 3.4198E−04 | −2.8961E−05 | 0.0000E+00 | 0.0000E+00 | 0.0000E+00 | 0.0000E+00 | 0.0000E+00 |
| S3 | 8.5590E−04 | −9.0059E−05 | 0.0000E+00 | 0.0000E+00 | 0.0000E+00 | 0.0000E+00 | 0.0000E+00 |
| S4 | 4.8276E−03 | −5.0240E−04 | 0.0000E+00 | 0.0000E+00 | 0.0000E+00 | 0.0000E+00 | 0.0000E+00 |
| S5 | 3.9941E−03 | −5.0322E−04 | 0.0000E+00 | 0.0000E+00 | 0.0000E+00 | 0.0000E+00 | 0.0000E+00 |
| S6 | −1.4509E−03 | 1.5833E−04 | 0.0000E+00 | 0.0000E+00 | 0.0000E+00 | 0.0000E+00 | 0.0000E+00 |
| S7 | 4.6607E−03 | −4.5867E−04 | 0.0000E+00 | 0.0000E+00 | 0.0000E+00 | 0.0000E+00 | 0.0000E+00 |
| S8 | 2.9215E−04 | −2.0317E−05 | 0.0000E+00 | 0.0000E+00 | 0.0000E+00 | 0.0000E+00 | 0.0000E+00 |
| S9 | 5.4529E−04 | −3.6424E−05 | 0.0000E+00 | 0.0000E+00 | 0.0000E+00 | 0.0000E+00 | 0.0000E+00 |
| S10 | 1.7074E−05 | −5.5014E−07 | 0.0000E+00 | 0.0000E+00 | 0.0000E+00 | 0.0000E+00 | 0.0000E+00 |
| S11 | −1.0988E−04 | 1.4962E−05 | −1.4301E−06 | 9.3554E−08 | −3.9820E−09 | 9.9236E−11 | −1.0979E−12 |
| S12 | −4.8390E−05 | 5.1887E−06 | −3.9714E−07 | 2.1116E−08 | −7.3992E−10 | 1.5345E−11 | −1.4255E−13 |
| S13 | −5.8738E−07 | 2.0875E−08 | −2.8103E−10 | −9.6858E−12 | 5.4289E−13 | −1.0440E−14 | 7.6267E−17 |
| S14 | 1.1794E−06 | −8.5906E−08 | 4.3652E−09 | −1.5184E−10 | 3.4478E−12 | −4.6050E−14 | 2.7437E−16 |

Figure 10:
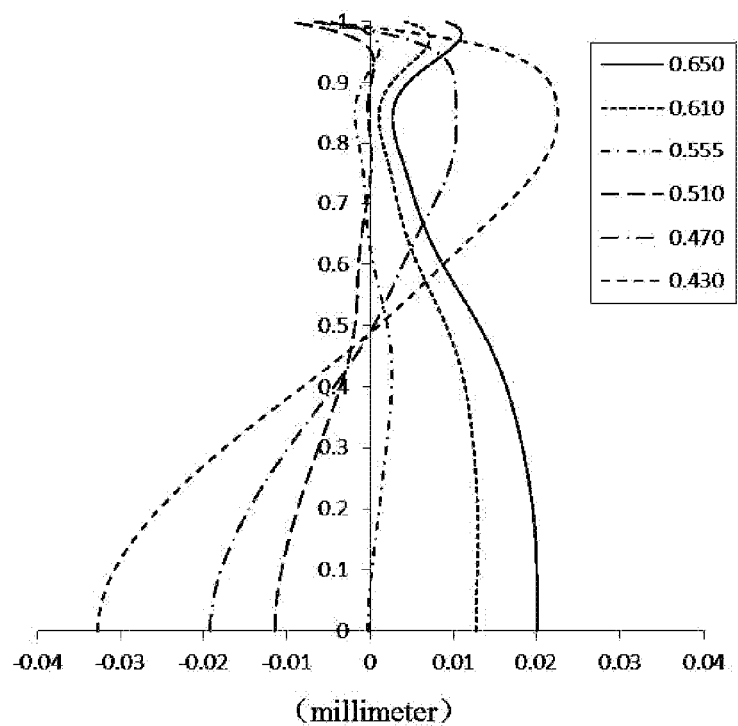
FIGS. 10-12 show a longitudinal aberration curve, an astigmatism curve and a distortion curve of the optical imaging lens group in FIG. 9 respectively.
Figure 11:
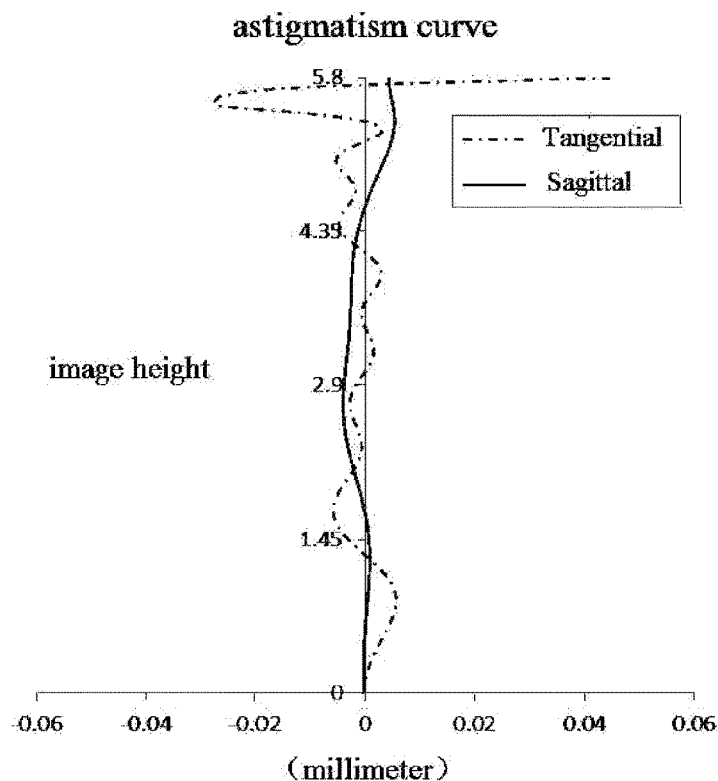
Figure 12:
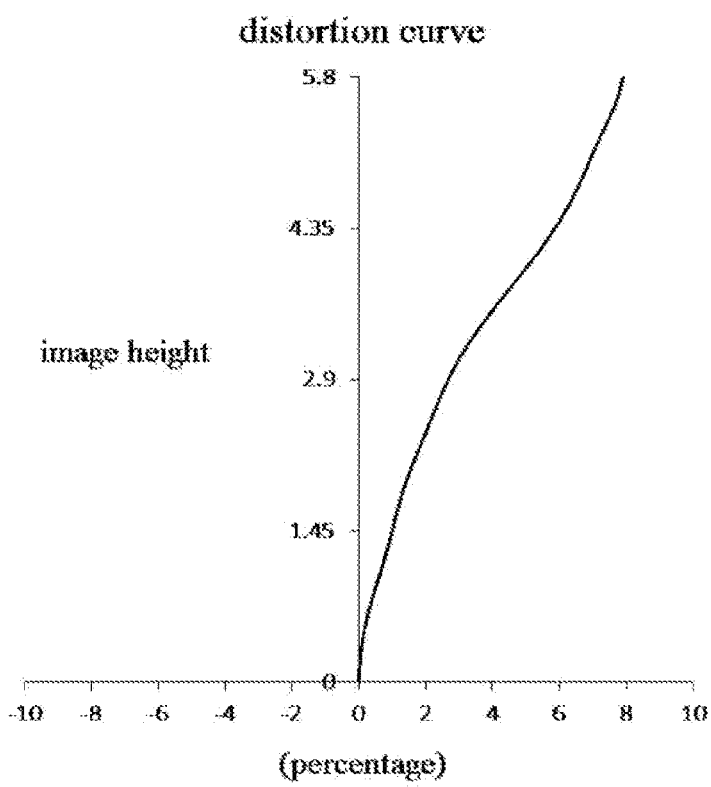

FIG. 10 shows a longitudinal aberration curve of the optical imaging lens group according to Example 3 to represent a deviation of a convergence focal point after light with different wavelengths passes through the optical imaging lens group. FIG. 11 shows an astigmatism curve of the optical imaging lens group according to Example 3 to represent a curvature of tangential image surface and a curvature of sagittal image surface. FIG. 12 shows a distortion curve of the optical imaging lens group according to Example 3 to represent distortion values corresponding to different field of views.

According to FIGS. 10-12, it can be seen that the optical imaging lens group provided in Example 3 may achieve high imaging quality.

Example 4

Figure 13:
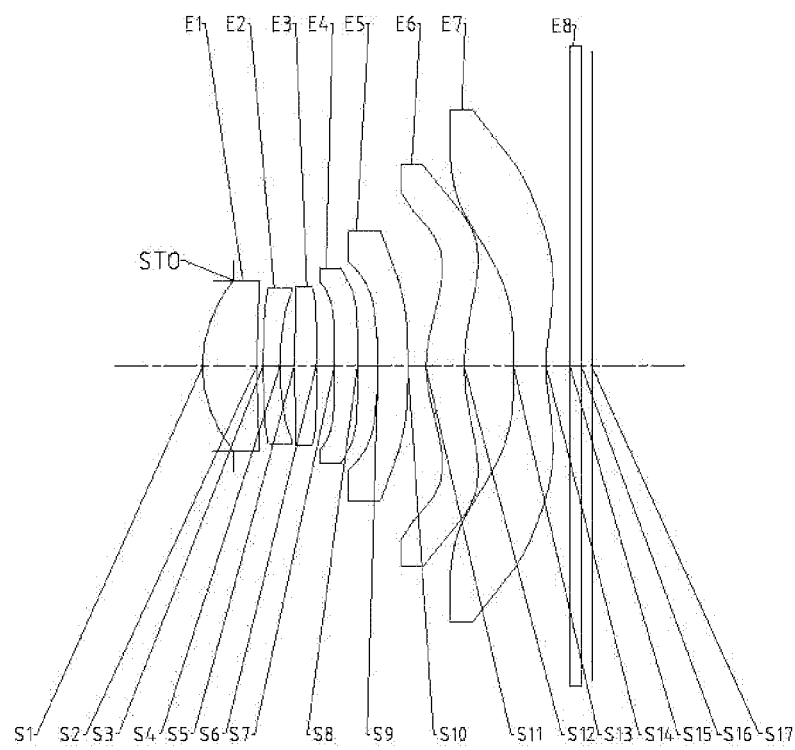
FIG. 13 shows a structural schematic diagram of an optical imaging lens group according to Example 4 of the disclosure.

As shown in FIGS. 13-16, an optical imaging lens group according to Example 4 of the disclosure is described. In the example and the following examples, parts of description similar to those in Example 1 are omitted for simplicity. FIG. 13 shows a structural schematic diagram of an optical imaging lens group according to Example 4.

As shown in FIG. 13, the optical imaging lens group sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a concave surface. The fourth lens E4 has a positive refractive power, an object-side surface S7 of the fourth lens is a convex surface, and an image-side surface S8 of the fourth lens is a concave surface. The fifth lens E5 has a negative refractive power, an object-side surface S9 of the fifth lens is a concave surface, and an image-side surface S10 of the fifth lens is a convex surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens group is 6.06 mm, a maximum field of view FOV of the optical imaging lens group is 83.31°, a spacing distance TTL from the object-side surface of the first lens to the imaging surface of the electronic photosensitive element on an optical axis is 7.20 mm, and ImgH is a half of a diagonal length of an effective pixel region of the electronic photosensitive element, and ImgH is 5.80 mm.

Table 7 shows a basic structural parameter table of the optical imaging lens group of Example 4, wherein the units of the curvature radius, the thickness/distance and the focal length are all millimeters (mm).

TABLE 7

| Surface number | Surface type | Curvature radius | Thickness | Material Refractive index | Abbe number | Conic coefficient |
|---|---|---|---|---|---|---|
| OBJ | Spherical | Infinite | 200.0000 | | | |
| STO | Spherical | Infinite | -0.5616 | | | |
| S1 | Aspheric | 2.3778 | 1.0000 | 1.55 | 56.1 | -5.7596 |
| S2 | Aspheric | 10.4631 | 0.1154 | | | -29.6562 |
| S3 | Aspheric | 10.1548 | 0.3150 | 1.68 | 19.2 | 36.1794 |
| S4 | Aspheric | 4.8794 | 0.2653 | | | -3.1248 |
| S5 | Aspheric | 11.1434 | 0.4036 | 1.55 | 56.1 | 17.4045 |
| S6 | Aspheric | 35.0612 | 0.3401 | | | -99.0000 |
| S7 | Aspheric | 110.0432 | 0.4289 | 1.67 | 20.4 | 99.0000 |
| S8 | Aspheric | 630.0000 | 0.3782 | | | 99.0000 |
| S9 | Aspheric | -6.9402 | 0.5500 | 1.62 | 25.9 | -98.1802 |
| S10 | Aspheric | -40.8383 | 0.3321 | | | -79.4384 |
| S11 | Aspheric | 2.2348 | 0.7100 | 1.54 | 55.7 | -0.9421 |
| S12 | Aspheric | 4.0088 | 0.9109 | | | -0.0058 |
| S13 | Aspheric | 124.9516 | 0.6045 | 1.54 | 55.7 | -33.8859 |
| S14 | Aspheric | 3.3979 | 0.4407 | | | -0.9887 |
| S15 | Spherical | Infinite | 0.2100 | 1.52 | 64.2 | |
| S16 | Spherical | Infinite | 0.1914 | | | |
| S17 | Spherical | Infinite | | | | |

Table 8 shows high-order coefficients applied to each of aspheric mirror surfaces in Example 4, wherein a surface type of each of aspheric surfaces may be defined by formula (1) given in Example 1.

TABLE 8

| Surface number | A4 | A6 | A8 | A10 | A12 | A14 | A16 |
|---|---|---|---|---|---|---|---|
| S1 | 5.2755E-02 | -1.7073E-02 | 7.7380E-03 | -2.8707E-03 | 4.5097E-04 | 2.1635E-04 | -1.7191E-04 |
| S2 | -1.4795E-02 | 3.3220E-03 | 8.8297E-03 | -2.0476E-02 | 2.2527E-02 | -1.5023E-02 | 6.0999E-03 |
| S3 | -2.9182E-02 | 1.4771E-02 | 7.9568E-04 | -1.0015E-02 | 1.0712E-02 | -6.0066E-03 | 1.9874E-03 |
| S4 | -6.3021E-03 | 1.3552E-02 | -1.5147E-03 | -8.3514E-03 | 1.4910E-02 | -1.4314E-02 | 8.4937E-03 |
| S5 | -1.0454E-02 | -5.0314E-03 | 1.4104E-02 | -3.2184E-02 | 4.2189E-02 | -3.6929E-02 | 2.0383E-02 |
| S6 | -9.8420E-03 | -2.3288E-02 | 5.9438E-02 | -1.0319E-01 | 1.1323E-01 | -8.0044E-02 | 3.4812E-02 |
| S7 | -2.3908E-02 | -1.0361E-02 | -3.2117E-02 | 8.6830E-02 | -1.0573E-01 | 7.4154E-02 | -3.0909E-02 |
| S8 | -7.7077E-04 | -2.8298E-02 | 5.0929E-03 | 1.3510E-02 | -1.6464E-02 | 9.3285E-03 | -2.9931E-03 |
| S9 | -2.1878E-02 | 2.4565E-02 | -4.3059E-02 | 3.9197E-02 | -2.3229E-02 | 8.9655E-03 | -2.1975E-03 |
| S10 | -6.1256E-02 | 4.4221E-02 | -2.9537E-02 | 1.4293E-02 | -4.6104E-03 | 9.4762E-04 | -1.1758E-04 |
| S11 | -7.2730E-02 | 2.5500E-02 | -4.9744E-03 | -5.0662E-03 | 5.3454E-03 | -2.6763E-03 | 8.6362E-04 |
| S12 | -4.2793E-03 | -2.0314E-02 | 2.1436E-02 | -1.4669E-02 | 6.6341E-03 | -2.0745E-03 | 4.6111E-04 |

TABLE 8-continued

| | | | | | | |
|---|---|---|---|---|---|---|
| S13 | −5.8356E−02 | 1.2104E−03 | 9.4198E−03 | −4.5384E−03 | 1.1280E−03 | −1.7657E−04 | 1.8685E−05 |
| S14 | −5.7928E−02 | 7.9641E−03 | 8.3862E−04 | −6.1110E−04 | 1.1315E−04 | −8.0482E−06 | −4.5966E−07 |

| Surface number | A18 | A20 | A22 | A24 | A26 | A28 | A30 |
|---|---|---|---|---|---|---|---|
| S1 | 4.4894E−05 | −4.3638E−06 | 0.0000E+00 | 0.0000E+00 | 0.0000E+00 | 0.0000E+00 | 0.0000E+00 |
| S2 | −1.3752E−03 | 1.3068E−04 | 0.0000E+00 | 0.0000E+00 | 0.0000E+00 | 0.0000E+00 | 0.0000E+00 |
| S3 | −3.4251E−04 | 1.8607E−05 | 0.0000E+00 | 0.0000E+00 | 0.0000E+00 | 0.0000E+00 | 0.0000E+00 |
| S4 | −2.8002E−03 | 3.9922E−04 | 0.0000E+00 | 0.0000E+00 | 0.0000E+00 | 0.0000E+00 | 0.0000E+00 |
| S5 | −6.3616E−03 | 8.6993E−04 | 0.0000E+00 | 0.0000E+00 | 0.0000E+00 | 0.0000E+00 | 0.0000E+00 |
| S6 | −8.4618E−03 | 8.8432E−04 | 0.0000E+00 | 0.0000E+00 | 0.0000E+00 | 0.0000E+00 | 0.0000E+00 |
| S7 | 7.0866E−03 | −6.8785E−04 | 0.0000E+00 | 0.0000E+00 | 0.0000E+00 | 0.0000E+00 | 0.0000E+00 |
| S8 | 5.2026E−04 | −3.7450E−05 | 0.0000E+00 | 0.0000E+00 | 0.0000E+00 | 0.0000E+00 | 0.0000E+00 |
| S9 | 3.0968E−04 | −1.8827E−05 | 0.0000E+00 | 0.0000E+00 | 0.0000E+00 | 0.0000E+00 | 0.0000E+00 |
| S10 | 7.9790E−06 | −2.2692E−07 | 0.0000E+00 | 0.0000E+00 | 0.0000E+00 | 0.0000E+00 | 0.0000E+00 |
| S11 | −1.9232E−04 | 3.0093E−05 | −3.2971E−06 | 2.4756E−07 | −1.2140E−08 | 3.5049E−10 | −4.5218E−12 |
| S12 | −7.3763E−05 | 8.4933E−06 | −6.9559E−07 | 3.9431E−08 | −1.4675E−09 | 3.2204E−11 | −3.1540E−13 |
| S13 | −1.3766E−06 | 7.0956E−08 | −2.5151E−09 | 5.8481E−11 | −8.0365E−13 | 4.9470E−15 | 0.0000E+00 |
| S14 | 1.5963E−07 | −1.7180E−08 | 1.0823E−09 | −4.3427E−11 | 1.0946E−12 | −1.5837E−14 | 1.0038E−16 |

Figure 15:
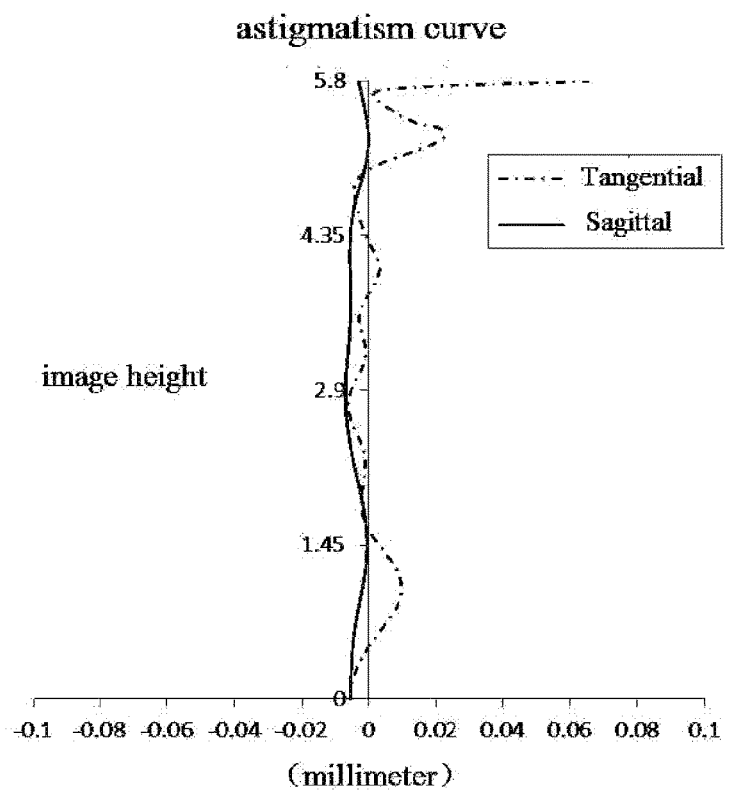
Figure 16:
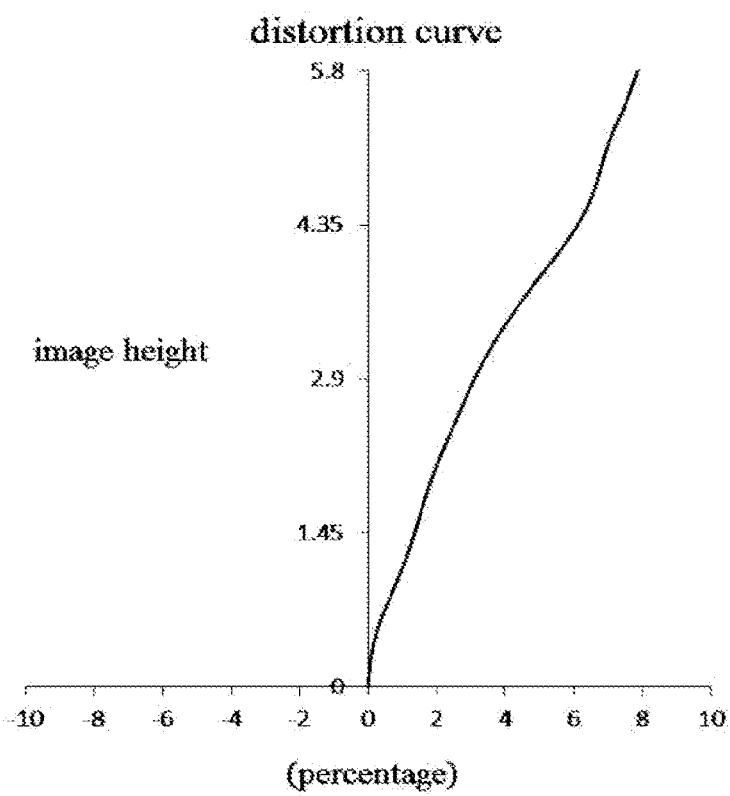

FIG. 14 shows a longitudinal aberration curve of the optical imaging lens group according to Example 4 to represent a deviation of a convergence focal point after light with different wavelengths passes through the optical imaging lens group. FIG. 15 shows an astigmatism curve of the optical imaging lens group according to Example 4 to represent a curvature of tangential image surface and a curvature of sagittal image surface. FIG. 16 shows a distortion curve of the optical imaging lens group according to Example 4 to represent distortion values corresponding to different field of views.

According to FIGS. 14-16, it can be seen that the optical imaging lens group provided in Example 4 may achieve high imaging quality.

Example 5

Figure 17:
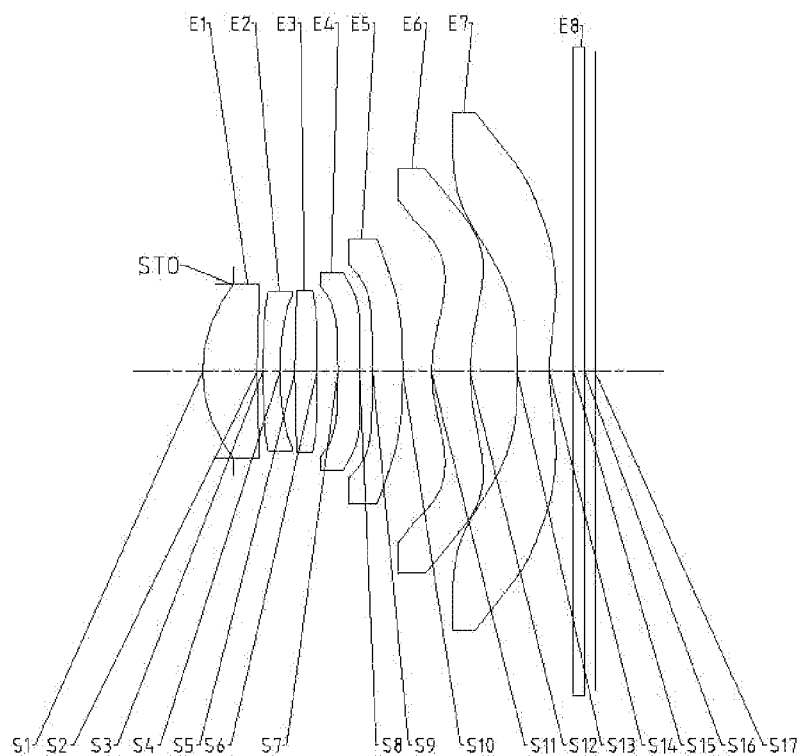
FIG. 17 shows a structural schematic diagram of an optical imaging lens group according to Example 5 of the disclosure.

As shown in FIGS. 17-20, an optical imaging lens group according to Example 5 of the disclosure is described. In the example and the following examples, parts of description similar to those in Example 1 are omitted for simplicity. FIG. 17 shows a structural schematic diagram of an optical imaging lens group according to Example 5.

As shown in FIG. 17, the optical imaging lens group sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a concave surface. The fourth lens E4 has a negative refractive power, an object-side surface S7 of the fourth lens is a concave surface, and an image-side surface S8 of the fourth lens is a concave surface. The fifth lens E5 has a positive refractive power, an object-side surface S9 of the fifth lens is a convex surface, and an image-side surface S10 of the fifth lens is a convex surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens group is 6.06 mm, a maximum field of view FOV of the optical imaging lens group is 83.22°, a spacing distance TTL from the object-side surface of the first lens to the imaging surface of the electronic photosensitive element on an optical axis is 7.20 mm, and ImgH is a half of a diagonal length of an effective pixel region of the electronic photosensitive element, and ImgH is 5.80 mm.

Table 9 shows a basic structural parameter table of the optical imaging lens group of Example 5, wherein the units of the curvature radius, the thickness/distance and the focal length are all millimeters (mm).

TABLE 9

| | | | | Material | | |
|---|---|---|---|---|---|---|
| Surface number | Surface type | Curvature radius | Thickness | Refractive index | Abbe number | Conic coefficient |
| OBJ | Spherical | Infinite | 150.0000 | | | |
| STO | Spherical | Infinite | −0.5605 | | | |
| S1 | Aspheric | 2.3836 | 1.0000 | 1.55 | 56.1 | −5.7969 |
| S2 | Aspheric | 10.4952 | 0.1033 | | | −37.5524 |
| S3 | Aspheric | 10.2221 | 0.3150 | 1.68 | 19.2 | 36.2752 |
| S4 | Aspheric | 5.0031 | 0.2760 | | | −3.5431 |
| S5 | Aspheric | 11.7458 | 0.4009 | 1.55 | 56.1 | 20.1589 |
| S6 | Aspheric | 96.5804 | 0.3856 | | | 99.0000 |
| S7 | Aspheric | −35.0580 | 0.4000 | 1.67 | 20.4 | 24.2291 |
| S8 | Aspheric | 17.9350 | 0.2386 | | | −99.0000 |
| S9 | Aspheric | 382.5095 | 0.5500 | 1.62 | 25.9 | 99.0000 |
| S10 | Aspheric | −130.5670 | 0.5241 | | | 99.0000 |
| S11 | Aspheric | 2.4653 | 0.7100 | 1.54 | 55.7 | −0.9368 |
| S12 | Aspheric | 3.8815 | 0.8627 | | | −0.0290 |
| S13 | Aspheric | 182.6935 | 0.5900 | 1.54 | 55.7 | 19.2329 |
| S14 | Aspheric | 3.3417 | 0.4391 | | | −1.0000 |
| S15 | Spherical | Infinite | 0.2100 | 1.52 | 64.2 | |
| S16 | Spherical | Infinite | 0.1906 | | | |
| S17 | Spherical | Infinite | | | | |

Table 10 shows high-order coefficients applied to each of aspheric mirror surfaces in Example 5, wherein a surface type of each of aspheric surfaces may be defined by formula (1) given in Example 1.

TABLE 10

| Surface number | A4 | A6 | A8 | A10 | A12 | A14 | A16 |
|---|---|---|---|---|---|---|---|
| S1 | 5.2815E−02 | −1.6919E−02 | 7.1023E−03 | −1.9811E−03 | −1.5622E−04 | 3.7117E−04 | −1.4521E−04 |
| S2 | −1.7711E−02 | 4.5512E−03 | 1.3753E−02 | −3.3326E−02 | 3.9442E−02 | −2.8328E−02 | 1.2240E−02 |
| S3 | −3.3516E−02 | 1.6492E−02 | 6.9595E−03 | −2.3830E−02 | 2.8143E−02 | −1.9866E−02 | 8.6193E−03 |
| S4 | −7.7466E−03 | 1.2461E−02 | 2.8313E−03 | −1.3951E−02 | 1.9293E−02 | −1.5916E−02 | 8.3176E−03 |
| S5 | −7.2390E−03 | −7.2330E−03 | 1.1158E−02 | −2.4276E−02 | 3.1571E−02 | −2.7391E−02 | 1.4910E−02 |
| S6 | −5.2325E−03 | −1.7179E−02 | 4.0440E−02 | −7.3860E−02 | 8.2743E−02 | −5.8897E−02 | 2.5590E−02 |
| S7 | −3.5332E−02 | 1.7745E−03 | −3.9933E−02 | 8.6953E−02 | −1.0087E−01 | 6.9667E−02 | −2.9001E−02 |
| S8 | −2.7622E−02 | 3.2723E−03 | −2.5508E−02 | 3.6163E−02 | −2.8687E−02 | 1.3811E−02 | −4.0496E−03 |
| S9 | −3.3560E−02 | 3.4879E−02 | −4.5321E−02 | 3.7472E−02 | −2.1633E−02 | 8.4014E−03 | −2.1131E−03 |
| S10 | −7.1466E−02 | 4.6713E−02 | −2.7119E−02 | 1.2047E−02 | −3.6654E−03 | 7.0467E−04 | −7.8624E−05 |
| S11 | −5.5102E−02 | 9.6006E−03 | −8.6656E−04 | −1.1769E−03 | 4.5501E−04 | 8.2890E−05 | −1.1897E−04 |
| S12 | −5.0930E−02 | −1.9025E−02 | 1.5641E−02 | −8.9393E−03 | 3.5561E−03 | −1.0082E−03 | 2.0737E−04 |
| S13 | −5.9863E−02 | 2.6695E−03 | 8.7692E−03 | −4.3743E−03 | 1.1038E−03 | −1.7465E−04 | 1.8656E−05 |
| S14 | −5.9851E−02 | 6.2737E−03 | 3.0384E−03 | −1.7443E−03 | 4.6385E−04 | −7.9937E−05 | 9.7263E−06 |

| Surface number | A18 | A20 | A22 | A24 | A26 | A28 | A30 |
|---|---|---|---|---|---|---|---|
| S1 | 2.1954E−05 | −9.5777E−07 | 0.0000E+00 | 0.0000E+00 | 0.0000E+00 | 0.0000E+00 | 0.0000E+00 |
| S2 | −2.9064E−03 | 2.8989E−04 | 0.0000E+00 | 0.0000E+00 | 0.0000E+00 | 0.0000E+00 | 0.0000E+00 |
| S3 | −2.0738E−03 | 2.0811E−04 | 0.0000E+00 | 0.0000E+00 | 0.0000E+00 | 0.0000E+00 | 0.0000E+00 |
| S4 | −2.4557E−03 | 3.1973E−04 | 0.0000E+00 | 0.0000E+00 | 0.0000E+00 | 0.0000E+00 | 0.0000E+00 |
| S5 | −4.5469E−03 | 6.0679E−04 | 0.0000E+00 | 0.0000E+00 | 0.0000E+00 | 0.0000E+00 | 0.0000E+00 |
| S6 | −6.1689E−03 | 6.3558E−04 | 0.0000E+00 | 0.0000E+00 | 0.0000E+00 | 0.0000E+00 | 0.0000E+00 |
| S7 | 6.6968E−03 | −6.5706E−04 | 0.0000E+00 | 0.0000E+00 | 0.0000E+00 | 0.0000E+00 | 0.0000E+00 |
| S8 | 6.6579E−04 | −4.6384E−05 | 0.0000E+00 | 0.0000E+00 | 0.0000E+00 | 0.0000E+00 | 0.0000E+00 |
| S9 | 3.0911E−04 | −1.9618E−05 | 0.0000E+00 | 0.0000E+00 | 0.0000E+00 | 0.0000E+00 | 0.0000E+00 |
| S10 | 4.4298E−06 | −8.8459E−08 | 0.0000E+00 | 0.0000E+00 | 0.0000E+00 | 0.0000E+00 | 0.0000E+00 |
| S11 | 4.6910E−05 | −1.0785E−05 | 1.6116E−06 | −1.5855E−07 | 9.9129E−09 | −3.5716E−10 | 5.6489E−12 |
| S12 | −3.1169E−05 | 3.4083E−06 | −2.6671E−07 | 1.4468E−08 | −5.1385E−10 | 1.0691E−11 | −9.8226E−14 |
| S13 | −1.3869E−06 | 7.2132E−08 | −2.5799E−09 | 6.0544E−11 | −8.3989E−13 | 5.2212E−15 | 0.0000E+00 |
| S14 | −8.5974E−07 | 5.5399E−08 | −2.5705E−09 | 8.3500E−11 | −1.8008E−12 | 2.3162E−14 | −1.3457E−16 |

Figure 18:
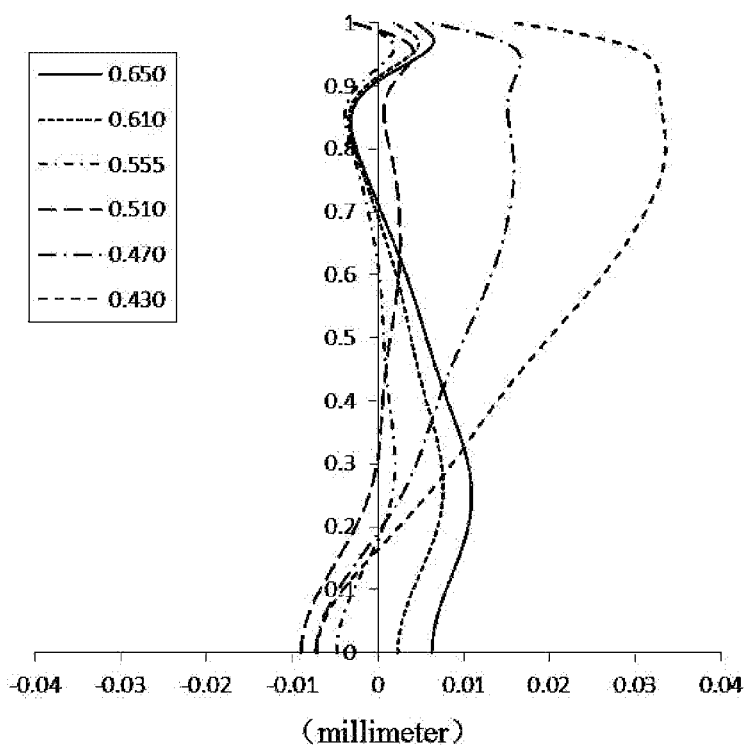
FIGS. 18-20 show a longitudinal aberration curve, an astigmatism curve and a distortion curve of the optical imaging lens group in FIG. 17 respectively.
Figure 19:
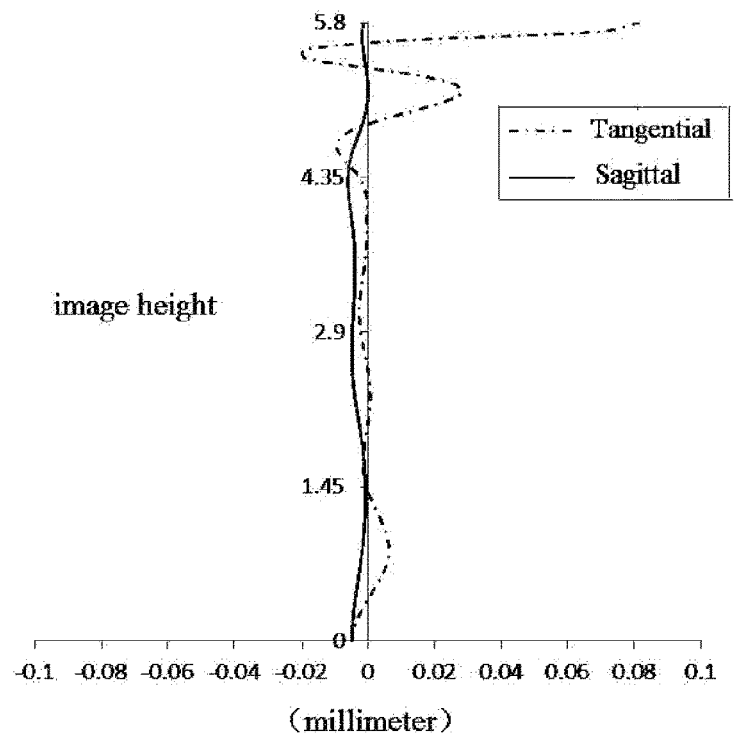
Figure 20:
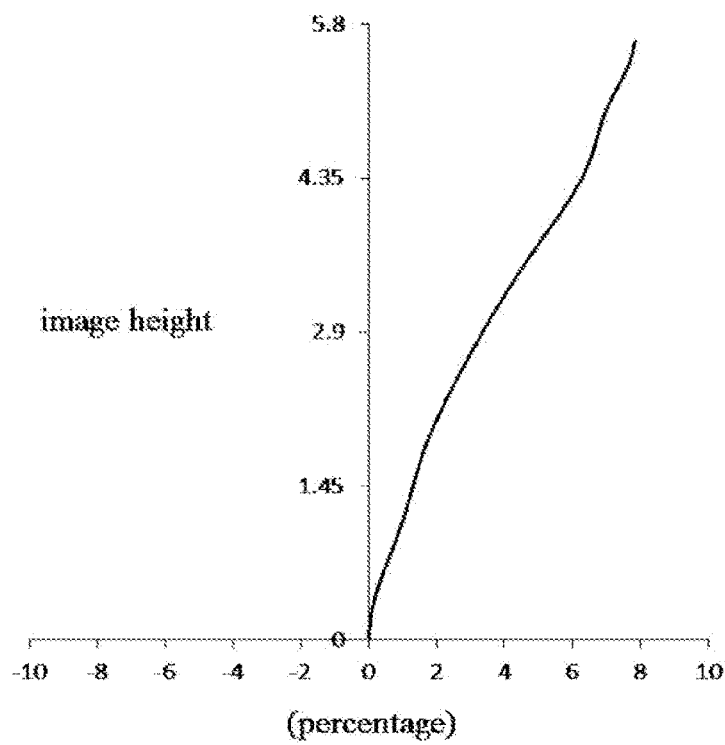

FIG. 18 shows a longitudinal aberration curve of the optical imaging lens group according to Example 5 to represent a deviation of a convergence focal point after light with different wavelengths passes through the optical imaging lens group. FIG. 19 shows an astigmatism curve of the optical imaging lens group according to Example 5 to represent a curvature of tangential image surface and a curvature of sagittal image surface. FIG. 20 shows a distortion curve of the optical imaging lens group according to Example 5 to represent distortion values corresponding to different field of views.

According to FIGS. 18-20, it can be seen that the optical imaging lens group provided in Example 5 may achieve high imaging quality.

Example 6

Figure 21:
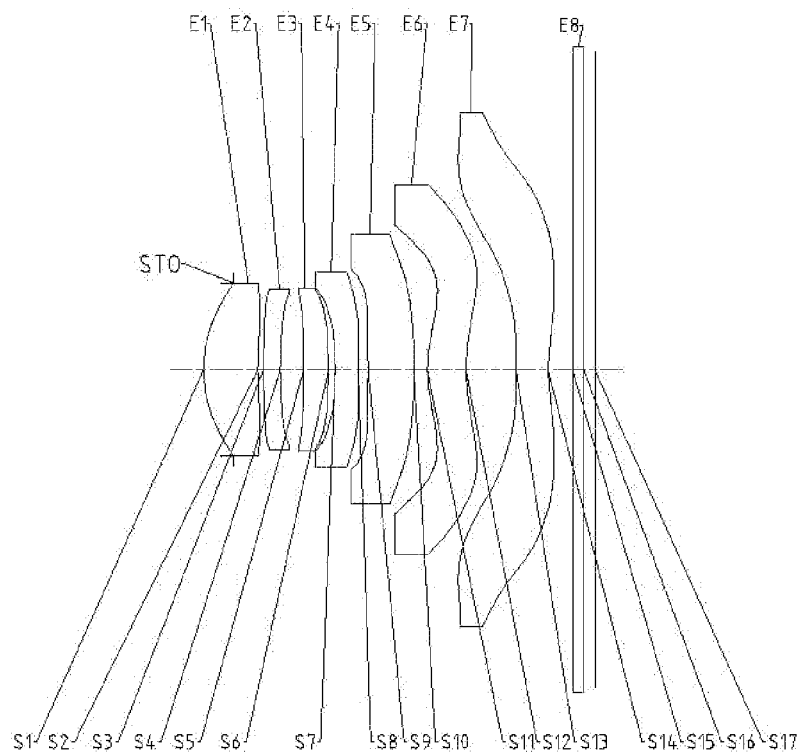
FIG. 21 shows a structural schematic diagram of an optical imaging lens group according to Example 6 of the disclosure.

As shown in FIGS. 21-24, an optical imaging lens group according to Example 6 of the disclosure is described. In the example and the following examples, parts of description similar to those in Example 1 are omitted for simplicity. FIG. 21 shows a structural schematic diagram of an optical imaging lens group according to Example 6.

As shown in FIG. 21, the optical imaging lens group sequentially includes from an object side to an image side: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a concave surface, and an image-side surface S6 of the third lens is a convex surface. The fourth lens E4 has a negative refractive power, an object-side surface S7 of the fourth lens is a concave surface, and an image-side surface S8 of the fourth lens is a concave surface. The fifth lens E5 has a positive refractive power, an object-side surface S9 of the fifth lens is a concave surface, and an image-side surface S10 of the fifth lens is a convex surface. The sixth lens E6 has a positive refractive power, an object-side surface S11 of the sixth lens is a convex surface, and an image-side surface S12 of the sixth lens is a concave surface. The seventh lens E7 has a negative refractive power, an object-side surface S13 of the seventh lens is a convex surface, and an image-side surface S14 of the seventh lens is a concave surface. Light from an object sequentially penetrates through each of the surfaces S1 to S16, and is finally imaged on the imaging surface S17.

In the example, a total effective focal length f of the optical imaging lens group is 6.06 mm, a maximum field of view FOV of the optical imaging lens group is 83.00°, a spacing distance TTL from the object-side surface of the first lens to the imaging surface of the electronic photosensitive element on an optical axis is 7.20 mm, and ImgH is a half of a diagonal length of an effective pixel region of the electronic photosensitive element, and ImgH is 5.80 mm.

Table 11 shows a basic structural parameter table of the optical imaging lens group of Example 6, wherein the units of the curvature radius, the thickness/distance and the focal length are all millimeters (mm).

TABLE 11

| Surface number | Surface type | Curvature radius | Thickness | Material Refractive index | Abbe number | Conic coefficient |
|---|---|---|---|---|---|---|
| OBJ | Spherical | Infinite | 150.0000 | | | |
| STO | Spherical | Infinite | −0.5446 | | | |
| S1 | Aspheric | 2.3499 | 1.0000 | 1.55 | 56.1 | −5.9867 |
| S2 | Aspheric | 7.0419 | 0.1000 | | | −80.6252 |
| S3 | Aspheric | 8.1101 | 0.3150 | 1.68 | 19.2 | 27.0901 |
| S4 | Aspheric | 8.4910 | 0.4286 | | | −7.5378 |
| S5 | Aspheric | −45.6159 | 0.4563 | 1.55 | 56.1 | 83.5567 |
| S6 | Aspheric | −14.7658 | 0.1219 | | | 89.9021 |
| S7 | Aspheric | −12.1504 | 0.4241 | 1.67 | 20.4 | 60.7962 |
| S8 | Aspheric | 19.8666 | 0.1858 | | | 98.3462 |
| S9 | Aspheric | −38.7511 | 0.8369 | 1.62 | 25.9 | −61.6022 |
| S10 | Aspheric | −34.6261 | 0.2475 | | | −4.2243 |
| S11 | Aspheric | 2.4352 | 0.7100 | 1.54 | 55.7 | −0.6020 |
| S12 | Aspheric | 3.6955 | 0.9194 | | | 0.0726 |
| S13 | Aspheric | 55.0151 | 0.5906 | 1.54 | 55.7 | 37.4742 |
| S14 | Aspheric | 3.0020 | 0.4492 | | | −1.0000 |
| S15 | Spherical | Infinite | 0.2100 | 1.52 | 64.2 | |
| S16 | Spherical | Infinite | 0.2007 | | | |
| S17 | Spherical | Infinite | | | | |

Table 12 shows high-order coefficients applied to each of aspheric mirror surfaces in Example 6, wherein a surface type of each of aspheric surfaces may be defined by formula (1) given in Example 1.

TABLE 12

| Surface number | A4 | A6 | A8 | A10 | A12 | A14 | A16 |
|---|---|---|---|---|---|---|---|
| S1 | 5.5875E−02 | −1.9646E−02 | 9.5353E−03 | −5.9175E−03 | 4.5381E−03 | −3.1238E−03 | 1.3554E−03 |
| S2 | −8.2380E−03 | −3.3295E−02 | 7.2203E−02 | −1.0699E−01 | 1.1026E−01 | −7.4392E−02 | 3.0719E−02 |
| S3 | −5.1273E−02 | 1.2402E−02 | −4.0953E−03 | 3.7437E−02 | −6.5084E−02 | 5.6682E−02 | −2.8278E−02 |
| S4 | −1.3146E−02 | 2.9737E−03 | 2.3621E−02 | −2.3427E−02 | 9.5776E−03 | 2.7145E−03 | −5.2038E−03 |
| S5 | −1.6070E−02 | 2.7924E−02 | −9.8891E−02 | 1.9009E−01 | −2.3876E−01 | 1.9104E−01 | −9.3789E−02 |
| S6 | −4.3820E−02 | 2.9501E−02 | 4.0906E−03 | −6.1109E−02 | 7.7332E−02 | −4.6962E−02 | 1.4992E−02 |
| S7 | −8.7524E−02 | 3.2029E−02 | 1.8671E−02 | −2.8918E−02 | −1.2596E−02 | 4.5981E−02 | −3.4741E−02 |
| S8 | −4.1655E−02 | −4.0345E−02 | 9.1441E−02 | −9.7674E−02 | 6.1738E−02 | −2.3551E−02 | 5.3432E−03 |
| S9 | 3.9707E−02 | −9.9537E−02 | 1.3615E−01 | −1.2873E−01 | 7.8855E−02 | −3.1660E−02 | 8.1339E−03 |
| S10 | −2.6321E−02 | −1.6794E−02 | 3.7575E−02 | −2.7153E−02 | 1.0557E−02 | −2.4515E−03 | 3.4198E−04 |
| S11 | −5.9566E−02 | −3.1147E−02 | 4.7400E−02 | −3.5956E−02 | 1.8395E−02 | −6.9725E−03 | 2.2127E−03 |
| S12 | 9.1450E−04 | −4.6704E−02 | 4.0194E−02 | −2.2146E−02 | 8.3224E−03 | −2.1338E−03 | 3.5748E−04 |
| S13 | −7.1150E−02 | 1.1001E−02 | 1.0835E−02 | −7.5255E−03 | 2.3241E−03 | −4.3462E−04 | 5.3891E−05 |
| S14 | −9.1943E−02 | 2.9162E−02 | −8.1065E−03 | 2.7536E−03 | −8.8680E−04 | 2.0180E−04 | −3.0932E−05 |

| Surface number | A18 | A20 | A22 | A24 | A26 | A28 | A30 |
|---|---|---|---|---|---|---|---|
| S1 | −3.2631E−04 | 3.2829E−05 | 0.0000E+00 | 0.0000E+00 | 0.0000E+00 | 0.0000E+00 | 0.0000E+00 |
| S2 | −6.9897E−03 | 6.6805E−04 | 0.0000E+00 | 0.0000E+00 | 0.0000E+00 | 0.0000E+00 | 0.0000E+00 |
| S3 | 7.7745E−03 | −9.1871E−04 | 0.0000E+00 | 0.0000E+00 | 0.0000E+00 | 0.0000E+00 | 0.0000E+00 |
| S4 | 2.3921E−03 | −3.6996E−04 | 0.0000E+00 | 0.0000E+00 | 0.0000E+00 | 0.0000E+00 | 0.0000E+00 |
| S5 | 2.5578E−02 | −2.9180E−03 | 0.0000E+00 | 0.0000E+00 | 0.0000E+00 | 0.0000E+00 | 0.0000E+00 |
| S6 | −2.5656E−03 | 2.3414E−04 | 0.0000E+00 | 0.0000E+00 | 0.0000E+00 | 0.0000E+00 | 0.0000E+00 |
| S7 | 1.1175E−02 | −1.3388E−03 | 0.0000E+00 | 0.0000E+00 | 0.0000E+00 | 0.0000E+00 | 0.0000E+00 |
| S8 | −6.7481E−04 | 3.7591E−05 | 0.0000E+00 | 0.0000E+00 | 0.0000E+00 | 0.0000E+00 | 0.0000E+00 |
| S9 | −1.2158E−03 | 7.9942E−05 | 0.0000E+00 | 0.0000E+00 | 0.0000E+00 | 0.0000E+00 | 0.0000E+00 |
| S10 | −2.6500E−05 | 8.7662E−07 | 0.0000E+00 | 0.0000E+00 | 0.0000E+00 | 0.0000E+00 | 0.0000E+00 |
| S11 | −6.7462E−04 | 1.9058E−04 | −4.2130E−05 | 6.4209E−06 | −6.2021E−07 | 3.3990E−08 | −8.0368E−10 |
| S12 | −3.4027E−05 | 5.7511E−07 | 2.9210E−07 | −4.0153E−08 | 2.5690E−09 | −8.5312E−11 | 1.1853E−12 |
| S13 | −4.5918E−06 | 2.7096E−07 | −1.0905E−08 | 2.8603E−10 | −4.4128E−12 | 3.0398E−14 | 0.0000E+00 |
| S14 | 3.2491E−06 | −2.3768E−07 | 1.2132E−08 | −4.2469E−10 | 9.7354E−12 | −1.3181E−13 | 7.9982E−16 |

Figure 22:
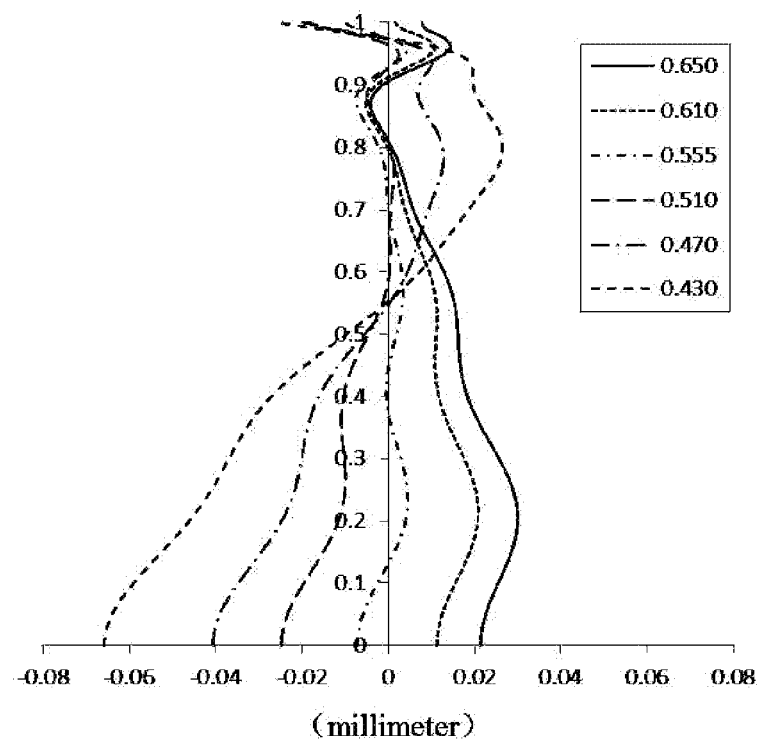
FIGS. 22-24 show a longitudinal aberration curve, an astigmatism curve and a distortion curve of the optical imaging lens group in FIG. 21 respectively.
Figure 23:
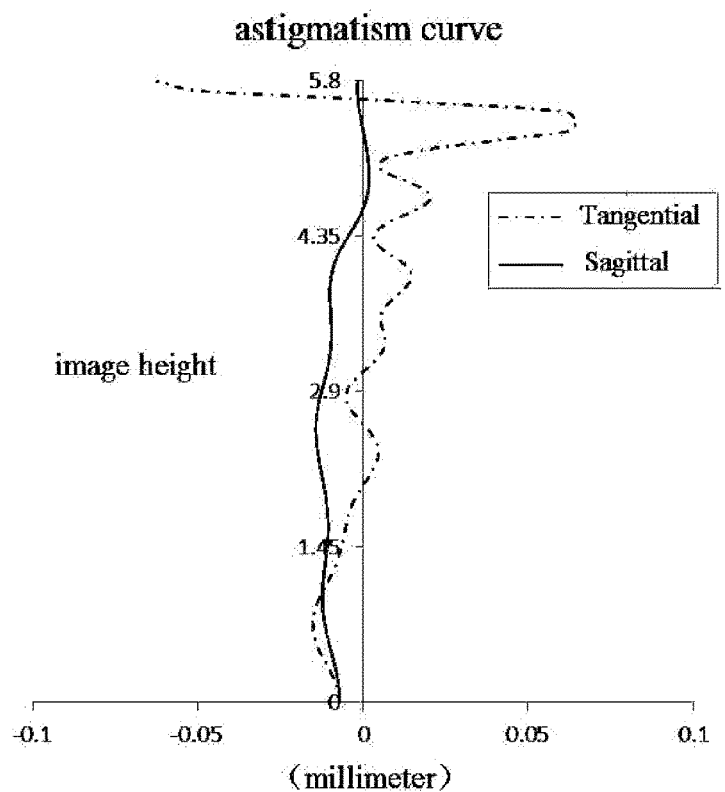
Figure 24:
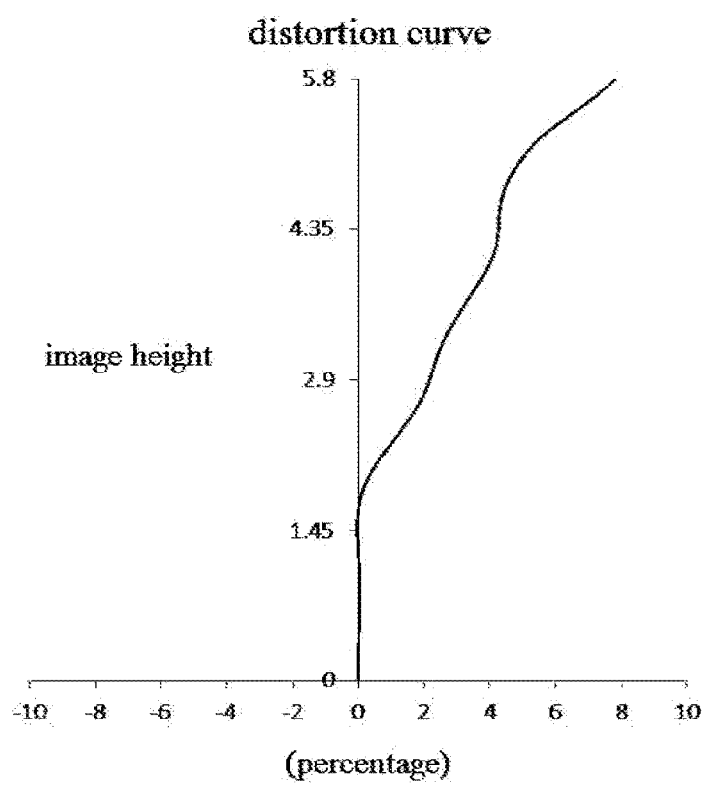

FIG. 22 shows a longitudinal aberration curve of the optical imaging lens group according to Example 6 to represent a deviation of a convergence focal point after light with different wavelengths passes through the optical imaging lens group. FIG. 23 shows an astigmatism curve of the optical imaging lens group according to Example 6 to represent a curvature of tangential image surface and a curvature of sagittal image surface. FIG. 24 shows a distortion curve of the optical imaging lens group according to Example 6 to represent distortion values corresponding to different field of views.

According to FIGS. 22-24, it can be seen that the optical imaging lens group provided in Example 6 may achieve high imaging quality.

From the above, Example 1 to Example 6 satisfy a relationship shown in Table 13 respectively.

TABLE 13

| Conditional expression | Example | | | | | |
| | 1 | 2 | 3 | 4 | 5 | 6 |
|---|---|---|---|---|---|---|
| tan(FOV/2)*f(mm) | 5.38 | 5.36 | 5.37 | 5.39 | 5.38 | 5.36 |
| R12/R14 | 1.13 | 1.46 | 1.22 | 1.18 | 1.16 | 1.23 |
| TTL/ImgH | 1.24 | 1.24 | 1.24 | 1.24 | 1.24 | 1.24 |
| f6/f7 | −1.65 | −1.35 | −1.41 | −1.27 | −1.69 | −1.87 |
| |R2 − R3|/T12 | 3.92 | 1.66 | 1.72 | 2.67 | 2.64 | 10.68 |

TABLE 13-continued

| Conditional expression | Example 1 | 2 | 3 | 4 | 5 | 6 |
|---|---|---|---|---|---|---|
| R11/f | 0.40 | 0.39 | 0.38 | 0.37 | 0.41 | 0.40 |
| 100*\|CT3 − CT4\| | 0.48 | 0.56 | 3.51 | 2.54 | 0.09 | 3.22 |
| T45/T56 | 0.72 | 1.02 | 0.56 | 1.14 | 0.46 | 0.75 |
| T67/TD | 1.42 | 1.34 | 1.48 | 1.43 | 1.36 | 1.45 |
| SAG62/CT6 | −1.12 | −1.20 | −1.03 | −1.09 | −1.17 | −1.00 |
| DT11/ImgH | 0.27 | 0.31 | 0.27 | 0.27 | 0.27 | 0.27 |
| (DT61 − DT52)/(DT51 − DT42) | 7.69 | 3.34 | 11.42 | 5.59 | 5.79 | 2.94 |
| ET5/CT5 | 0.91 | 1.06 | 1.04 | 1.09 | 0.92 | 0.85 |
| YT61/YT62 | 0.96 | 0.94 | 1.19 | 1.19 | 1.05 | 0.92 |
| OT/TTL | 27.79 | 13.89 | 27.78 | 27.78 | 20.83 | 20.84 |
| \|DISTmax\|(%) | 7.92 | 7.96 | 8.04 | 7.85 | 7.97 | 7.78 |

Table 14 shows the effective focal length f, the effective focal lengths f1 to f7 of each lens, and the maximum field of view FOV of the optical imaging lens group in Example 1 to Example 6.

TABLE 14

| Parameter | Example 1 | 2 | 3 | 4 | 5 | 6 |
|---|---|---|---|---|---|---|
| TTL(mm) | 7.20 | 7.20 | 7.20 | 7.20 | 7.20 | 7.20 |
| ImgH(mm) | 5.80 | 5.80 | 5.80 | 5.80 | 5.80 | 5.80 |
| FOV(°) | 83.23 | 83.20 | 83.15 | 83.31 | 83.22 | 83.00 |
| Fno | 1.93 | 1.70 | 1.93 | 1.93 | 1.93 | 1.92 |
| f(mm) | 6.06 | 6.04 | 6.06 | 6.06 | 6.06 | 6.06 |
| f1(mm) | 5.48 | 5.55 | 5.27 | 5.40 | 5.41 | 6.01 |
| f2(mm) | −15.97 | −16.64 | −17.16 | −14.21 | −14.82 | 200.00 |
| f3(mm) | 27.56 | 39.13 | −166.66 | 29.74 | 24.45 | 39.78 |
| f4(mm) | −31.97 | −39.39 | −133.25 | 200.00 | −17.75 | −11.25 |
| f5(mm) | −53.41 | −36.72 | −36.47 | −13.59 | 157.25 | 487.44 |
| f6(mm) | 10.41 | 10.28 | 8.83 | 8.25 | 10.71 | 11.12 |
| f7(mm) | −6.32 | −7.62 | −6.28 | −6.52 | −6.35 | −5.94 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens group.

It is apparent that the described embodiments are not all but only part of embodiments of the disclosure. All other embodiments obtained by those of ordinary skill in the art based on the embodiments in the disclosure without creative work shall fall within the scope of protection of the disclosure.

It is to be noted that terms used herein are only adopted to describe specific implementation modes and not intended to limit exemplary implementation modes according to the disclosure. For example, singular forms, used herein, are also intended to include plural forms, unless otherwise clearly pointed out. In addition, it is also to be understood that terms "contain" and/or "include" used in the specification refer/refers to existence of features, steps, work, apparatuses, components and/or combinations thereof.

It is to be noted that terms "first", "second" and the like in the specification, claims and drawings of the present disclosure are adopted not to describe a specific sequence or order but to distinguish similar objects. It is to be understood that data used like this may be exchanged under a proper condition for implementation of the implementation modes, described herein, of the present disclosure in sequences besides those shown or described here.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. An optical imaging lens group, sequentially comprising from an object side to an image side along an optical axis of the optical imaging lens group:
    a first lens with a positive refractive power;
    a second lens with a refractive power, an image-side surface of the second lens thereof is a concave surface;
    a third lens with a refractive power;
    a fourth lens with a refractive power, an image-side surface of the fourth lens thereof is a concave surface;
    a fifth lens with a refractive power;
    a sixth lens with a refractive power, an image-side surface of the sixth lens thereof is a concave surface; and
    a seventh lens with a negative refractive power, an object-side surface of the seventh lens is a convex surface and an image-side surface of the seventh lens is a concave surface;
    wherein a maximum field of view FOV of the optical imaging lens group and an effective focal length f of the optical imaging lens group satisfy tan(FOV/2)*f>5 mm; and
    a curvature radius R12 of the image-side surface of the sixth lens and a curvature radius R14 of an image-side surface of the seventh lens satisfy 1<R12/R14<2;
    a curvature radius R2 of an image-side surface of the first lens, a curvature radius R3 of an object-side surface of the second lens, and a spacing distance T12 between the first lens and the second lens on the optical axis satisfy |R2−R3|/T12≤3.92;
    an effective focal length f6 of the sixth lens and an effective focal length f7 of the seventh lens satisfy −2<f6/f7<−1.

2. The optical imaging lens group according to claim 1, wherein the optical imaging lens group is arranged on an electronic photosensitive element, and ImgH is a half of a diagonal length of an effective pixel region of the electronic photosensitive element, and a spacing distance TTL from an object-side surface of the first lens to an imaging surface of the electronic photosensitive element on the optical axis and ImgH satisfy TTL/ImgH<1.5.

3. The optical imaging lens group according to claim 1, wherein a curvature radius R11 of an object-side surface of the sixth lens and the effective focal length f of the optical imaging lens group satisfy R11/f<0.5.

4. The optical imaging lens group according to claim 1, wherein a center thickness CT3 of the third lens on the optical axis and a center thickness CT4 of the fourth lens on the optical axis satisfy 100*|CT3−CT4|<10.

5. The optical imaging lens group according to claim 1, wherein a spacing distance T45 between the fourth lens and the fifth lens on the optical axis and a spacing distance T56 between the fifth lens and the sixth lens on the optical axis satisfy T45/T56<1.5.

6. The optical imaging lens group according to claim 1, wherein an on-axis spacing distance SAG62 from an intersection point of the image-side surface of the sixth lens and the optical axis to an effective radius vertex of the image-side surface of the sixth lens and a center thickness CT6 of the sixth lens on the optical axis satisfy $-1.5<\text{SAG62}/\text{CT6}<-0.9$.

7. The optical imaging lens group according to claim 1, wherein ImgH is a half of a diagonal length of an effective pixel region of the electronic photosensitive element, and an effective semi-diameter DT11 of an object-side surface of the first lens and ImgH satisfy $\text{DT11}/\text{ImgH}<0.4$.

8. The optical imaging lens group according to claim 1, wherein an effective radius DT61 of an object-side surface of the sixth lens, an effective radius DT52 of an image-side surface of the fifth lens, an effective radius DT51 of an object-side surface of the fifth lens and an effective radius DT42 of the image-side surface of the fourth lens satisfy $2<(\text{DT61}-\text{DT52})/(\text{DT51}-\text{DT42})<20$.

9. The optical imaging lens group according to claim 1, wherein an edge thickness ET5 of the fifth lens and a center thickness CT5 of the fifth lens on the optical axis satisfy $0.8<\text{ET5}/\text{CT5}<1.2$.

10. The optical imaging lens group according to claim 1, wherein each of an object-side surface of the sixth lens and the image-side surface of the sixth lens has at least one critical point, and a vector height YT61 along the optical axis from the center of the object-side surface of the sixth lens to the critical point of the object-side surface of the sixth lens closest to the optical axis and a vector height YT62 along the optical axis from the center of the image-side surface of the sixth lens to the critical point of the image-side surface of the sixth lens closest to the optical axis satisfy $0.8<\text{YT61}/\text{YT62}<1.3$.

11. The optical imaging lens group according to claim 1, wherein a distance OT from a shot object to an object-side surface of the first lens on the optical axis and a spacing distance TTL from the object-side surface of the first lens to the imaging surface of an electronic photosensitive element on the optical axis satisfy $\text{OT}/\text{TTL}<30$.

12. The optical imaging lens group according to claim 1, wherein an abbe number V3 of the third lens and an abbe number V4 of the fourth lens satisfy $V3>V4$.

13. The optical imaging lens group according to claim 1, wherein a maximum distortion DISTmax of the optical imaging lens group satisfies $5\%<|\text{DISTmax}|<50\%$.

\* \* \* \* \*